(12) United States Patent
Pophristic

(10) Patent No.: US 12,205,807 B2
(45) Date of Patent: Jan. 21, 2025

(54) MULTI-MODE IONIZATION APPARATUS AND USES THEREOF

(71) Applicant: Milan Pophristic, Princeton, NJ (US)

(72) Inventor: Milan Pophristic, Princeton, NJ (US)

(73) Assignee: MSTM, LLC, Newark, DE (US)

( * ) Notice: Subject to any disclaimer, the term of this patent is extended or adjusted under 35 U.S.C. 154(b) by 129 days.

(21) Appl. No.: 17/301,385

(22) Filed: Mar. 31, 2021

(65) Prior Publication Data

US 2021/0343518 A1    Nov. 4, 2021

Related U.S. Application Data

(60) Provisional application No. 63/003,299, filed on Apr. 1, 2020.

(51) Int. Cl.
*H01J 49/04* (2006.01)
*G01N 27/623* (2021.01)
(Continued)

(52) U.S. Cl.
CPC ............ *H01J 49/04* (2013.01); *G01N 27/623* (2021.01); *H01J 49/0027* (2013.01);
(Continued)

(58) Field of Classification Search
CPC ........ H01J 49/164; H01J 49/16; H01J 49/161; H01J 49/162; H01J 49/04; H01J 49/0418; H01J 49/0495
See application file for complete search history.

(56) References Cited

U.S. PATENT DOCUMENTS 5,910,656 A * 6/1999 Koster ................ H01J 49/0409
250/252.1
6,331,702 B1   12/2001 Krutchinsky et al.
(Continued)

FOREIGN PATENT DOCUMENTS

WO   9938185 A2   7/1999
WO   0077822 A2   12/2000

OTHER PUBLICATIONS

Hoang et al. "a combination MAI and MALDI vacuum source operational from atmospheric pressure for fast, robust and se3nsitive analyses", Nov. 17, 2020 (Year: 2020).*
(Continued)

*Primary Examiner* — Michael J Logie
(74) *Attorney, Agent, or Firm* — Duane Morris LLP

(57) ABSTRACT

An ionizing system includes a flange device for connection to a mass spectrometer or ion mobility spectrometer having the property of providing a barrier between the lower pressure region of the spectrometer and a higher pressure region substantially at atmospheric pressure, and a channel therethrough providing fluid communication between the higher and lower pressure regions. A plate device independent of the flange device which can accommodate multiple samples, such as a sample plate device, when placed over the channel in the flange device substantially seals the channel Sliding the sample plate device while in intimate contact with the flange device provides a means to sequentially and rapidly expose said samples to the opening of the channel and thus the lower pressure region. Samples are ionized when exposed to the lower pressure region in as little as one sample per second using multiple ionization methods.

25 Claims, 13 Drawing Sheets

(51) Int. Cl.
*H01J 49/00* (2006.01)
*H01J 49/06* (2006.01)
*H01J 49/16* (2006.01)
*H01J 49/24* (2006.01)

(52) U.S. Cl.
CPC ...... *H01J 49/0409* (2013.01); *H01J 49/0418* (2013.01); *H01J 49/0495* (2013.01); *H01J 49/067* (2013.01); *H01J 49/164* (2013.01); *H01J 49/165* (2013.01); *H01J 49/24* (2013.01)

(56) References Cited

U.S. PATENT DOCUMENTS

| | | | | |
|---|---|---|---|---|
| 6,707,036 | B2 | 3/2004 | Makarov et al. | |
| 6,707,040 | B2 | 3/2004 | Makarov et al. | |
| 2004/0021071 | A1* | 2/2004 | Mordekhay | H01J 49/0413 250/288 |
| 2010/0276592 | A1* | 11/2010 | Persoon | H01J 37/20 313/361.1 |
| 2013/0306856 | A1* | 11/2013 | Trimpin | H01J 49/04 250/282 |
| 2014/0166875 | A1* | 6/2014 | Trimpin | H01J 49/24 250/288 |
| 2014/0291507 | A1* | 10/2014 | Brown | H01J 49/16 250/288 |
| 2018/0158645 | A1* | 6/2018 | Cho | H01J 37/28 |
| 2020/0395203 | A1* | 12/2020 | Murray | H01J 49/0495 |
| 2022/0214307 | A1* | 7/2022 | Yamauchi | G01N 27/64 |

OTHER PUBLICATIONS

Timpin et al., "matrix assisted ionization in vacuum, a sensitive and widely applicable Ionization method for mass spectrometry", J. Am. Soc. Mass Spectrom (Year: 2013).*
Woodall, et al., "High-Throughput Characterization of Small and Large Molecules Using Only a Matrix and the Vacuum of a Mass Spectrometer", Anal. Chem., 2015, 87, 4667-4674.
Trimpin, et al., "Magic matrices for ionization in mass spectrometry", International Journal of Mass Spectrometry, 2015, 377, 532-545.
Wang, et al., "Matrix-Assisted Ionization Vacuum for High-Resolution Fourier Transform Ion Cyclotron Resonance Mass Spectrometers", Anal. Chem., 2014, 86, 6792-6796.
Lutomski, et al., "Transmission Geometry Laserspray Ionization Vacuum Using an Atmospheric Pressure Inlet", Anal. Chem., 2014, 86, 6208-6213.
Wang, et al., "High-Throughput Solvent Assisted Ionization Inlet for Use in Mass Spectrometry", Anal. Chem., 2014, 86, 1000-1006.
Trimpin, et al., "New Ionization Method for Analysis on Atmospheric Pressure Ionization Mass Spectrometers Requiring Only Vacuum and Matrix Assistance", Anal. Chem., 2013, 85, 2005-2009.
Trimpin, et al., "Matrix Assisted Ionization in Vacuum, a Sensitive and Widely Applicable Ionization Method for Mass Spectrometry", J. Am. Soc. Mass Spectrom., 2013, 24:722-732.
McEwen, et al., "Sublimation Driven Ionization for use in Mass Spectrometry: Mechanistic Implications", J. Am. Soc. Mass Spectrom., 2021, 32(1) 114-123.

* cited by examiner

MULTI-MODE IONIZATION APPARATUS AND USES THEREOF

CROSS-REFERENCES FOR RELATED APPLICATIONS

This application claims priority to U.S. provisional application No. 63/003,299, filed Apr. 1, 2020.

FIELD OF DISCLOSURE

The disclosed systems and methods relate to mass spectrometry (MS). More specifically, the disclosed systems and methods relate to an ionization assembly for use as an ion source of a mass spectrometer and an ion mobility spectrometer, the ionization assembly allows use of multiple ionization methods and is capable of fast sequential ionization of multiple samples utilizing vacuum ionization with and without the use of a laser, while being compatible with atmospheric pressure ionization methods.

FIELD OF INVENTION

Background of Invention

Mass spectrometry (MS) is an analytical technology which has the inherent advantage of requiring very little sample yet provides a wealth of information, often not readily obtainable with any other analytical technology. Closely related technologies and methods are ion mobility spectrometry (IMS) and charge detector mass spectrometry (CDMS) and certain spectroscopy instruments and are sometimes used in a hyphenated fashion or performed on a mass spectrometer which have in common, measuring gaseous ions in one form or another and there through obtaining information on the chemical and molecular composition or structural information or structure function relationships. Currently, ionization methods of electrospray ionization (ESI), matrix-assisted laser desorption/ionization (MALDI), and ambient ionization are commercially available and widely used in laboratories to create gaseous ions of small, large, and very large molecules (analyte) from samples of interest (a sample may constitute one or more or thousands of components, also referred to as molecules, compounds, or analyte making up the 'chemical' and 'molecular' composition of a material, substance, fabric, biopsy, film, etc.). These technologies are expensive in their initial cost (e.g., laser, high-voltage supply, operator), use of consumables (e.g., high pressure gases, specialized hardware), operator expertise (e.g., training, upkeep, safety), and for atmospheric pressure ionization (API) methods, the need for high pumping capacity. API methods, some of which are commercially available, include but are not limited to ESI, nanoESI, atmospheric pressure chemical ionization (APCI), atmospheric pressure photoionization (APPI), and associated methods such as desorption-ESI (DESI), direct analysis in real time (DART), atmospheric solids analysis probe (ASAP), nano-DESI, liquid junction approaches, matrix-assisted laser desorption ESI (MALDESI), and others known to the practitioner. Direct analysis of biological fluids and other 'dirty' or salty samples is problematic in MS primarily because of suppression of analyte ionization, carryover, and ion source or instrument contamination. In ESI and MALDI additives (e.g., formic acid) and matrix combinations (matrix is defined as a solid, e.g., 2,5-dihydroxybenzoic acid [2,5-DHB]) or liquid, e.g., water, acetonitrile) are frequently used. Certain forms of sample preparation may cause sample degradation prior to analyses and some ionization sources and methods are known to undesirably fragment the molecule or the ion during the ionization process.

ESI-based methods form multiply charged ions and MALDI methods predominantly singly charged ions. Advantages of singly charged ions include the relative ease in data interpretation. Advantages of multiply charged ions, even of large proteins and protein complexes, are the ability to mass measure high mass compounds on mass range limited mass spectrometers because mass spectrometers measure mass-to-charge (m/z) rather than mass. Thus, a compound of molecular weight (MW) 10,000 with 10 charges (10,010 assuming protons are the charge carrier) will appear at m/z 1001. Deconvolution programs are typically used to provide the mass (MW) representation of the data.

Liquid chromatography (LC) can be used for separating complex samples prior to MS analyses. LC/MS and MS/MS is typically performed "online" with ESI or APCI sources and methods or "offline" with MALDI. RapidFire from Agilent includes a form of quick LC separation but suffers from robustness of the setup and experiments requiring significant user expertise in running, operating and maintaining the instrument and methods. The ionization is based on ESI and achievable speed is at ca. 6 seconds per sample. Echo-MS from Sciex is a newer ESI-based variation for rapid analyses by MS which can sample ca. 1 sample per second and in certain cases up to 3 samples per second. The speed of this system is only achieved by limiting information content in that multiple reaction monitoring (MRM) is employed for known molecules and their respective m/z ratios. The ECHO-MS system and the necessary use of MRM to achieve speed of analyses, is therefore one limitation. The utility seems to lie in small molecules, and therefore wider utility is even further reduced.

Some form of sample cleanup is generally utilized with these methods, especially with ESI and APCI-based ionization sources and methods, which increase time, cost of analysis, and risk to the operator if the samples are too dangerous to be handled (e.g., toxic, contagious, or deadly such as bacterial, viral, fungi, or radioactive compounds contained in certain materials). Highly desirable in, e.g., clinical laboratories without, or limited, MS expertise is the ability to convert compounds to gas-phase ions regardless of their MW's or volatility with high sensitivity without instrument or ion source contamination or carryover issues (robustness) even when analyzing high concentration samples. Additional desirable attributes are inexpensive consumables, simple user interface, reduced pumping needs, lower instrument cost for operation, and rapid, reproducible, and sensitive analyses by untrained personnel. The inventions described herein eliminate or alleviate these issues which limit the more widespread use of mass spectrometric full mass range applications for human and environmental benefit.

Conversion of compounds into gas-phase ions for analysis by MS is advantageously accomplished under vacuum conditions to eliminate significant ion losses in transferring ions from AP to the vacuum conditions of the mass analyzer. Losses are partly because of the small aperture opening necessary for interfacing the vacuum of a mass spectrometer to AP, and partly because of so-called rim losses due to electric field lines near the aperture opening when voltages are used in the ionization region.

However, directly transferring a solid or liquid sample from ambient pressure to the sub-AP of the vacuum ion source where ionization is initiated has traditionally been accomplished in a manner which is both time intensive and expensive. In its simplest form, the sample on a substrate is introduced to a chamber at ambient pressure, the chamber is then sealed and pumped to a pressure sufficiently low to open a valve to the vacuum ion source without undo gas load on the mass analyzer. This step is followed by inserting the sample into the ionization region. In other words, the sample support is introduced into vacuum through vacuum lock which increase the time for insertion and/or the cost of additional pumping capacity. A number of patents relate to vacuum MALDI including WO 99/38185, U.S. Pat. No. 6,331,702 B1, WO 00/77822 A2, U.S. Pat. No. 6,707,036 B2, U.S. Pat. No. 6,707,040 and others included in the list of US patent documents. Of these U.S. Pat. Nos. 6,707,036 and 6,707,040 relate most closely to the present invention in that a vacuum lock is not necessary. However, as will be disclosed, the methods of claims U.S. Pat. Nos. 6,707,036 and 6,707,040 differ in important aspects from the present invention, including having the sample near AP with a high velocity of gas passing over the sample and the necessity of additional pumping as well as a small diameter channel between AP and the vacuum of the mass analyzer. The small diameter channel is required by the substrate holding the sample, and the sample itself, being spaced 50-100 microns above the orifice. In the present invention described herein, a sample plate device holding the sample is designed to achieve a substantial vacuum tight seal through intimate contact with a flange device having a channel therethrough as will be described in detail below. Further, the method of U.S. Pat. No. 6,707,036 requires a means of delivering energy to the sample spots to initiate ionization, whereas in the present invention, ionization occurs spontaneously when using a method termed matrix-assisted ionization (MAI) under vacuum conditions, or vMAI. U.S. Pat. No. 6,707,040 expands on U.S. Pat. No. 6,707,036 in that the spacing between the slide with sample and the orifice to the mass spectrometer is eliminated, but is replaced by channels which are open to AP, whereas in the present invention, channels are sealed to substantially prevent air flow and allow larger channels in the flange separating the higher pressure region, typically atmospheric pressure, from the lower pressure region of the analyzer.

Accordingly, ionization in the arrangements described in U.S. Pat. No. 6,707,040 occurs at AP and are thus AP-MALDI. Further, the methods of U.S. Pat. Nos. 6,707,036 and 6,707,040 are substantially more expensive than that of the invention described herein, and require precise machining to achieve the desired results as well as additional pumping capacity. Additionally, no data were presented for comparison with the invention described herein.

Importantly, because in the approach described in U.S. Pat. Nos. 6,707,036 and 6,707,040, AP is in fluid communication with the vacuum of the mass analyzer through an aperture, the size of said aperture is inversely related to the pumping requirements in order to maintain the operational pressure. Increasing the aperture size beyond that used in AP ionization for any instrument requires additional pumping capacity. Thus, the aperture must be maintained small which reduces sensitivity relative to larger apertures of the present invention which better transmit ions and suffer less rim losses and increases the likelihood for contamination of the source and instrument. The orifice specification in U.S. Pat. No. 6,707,040 is 0.2-2 mm, whereas the aperture for the channel in the flange device of the present invention can be substantially larger because the ionization region is sealed from AP. Larger inner diameter channels achieve better ion transmission. Only laser ablation is described in U.S. Pat. Nos. 6,707,040 and 6,707,036, whereas the present invention is capable of ionization with or without use of a laser.

MALDI has been demonstrated from AP performed on API mass spectrometers, but is less sensitive than vacuum MALDI. So called pulsed dynamic focusing has been used to increase the sensitivity and mass resolution. In this ion focusing approach a voltage is applied to extract ions and turned off before the ions reach the inlet aperture so that ion losses at the rim of the inlet are reduced. Clusters are not effectively dealt with leading to potential contamination and lower sensitivities. Ionization under vacuum conditions allows large apertures that do not restrict ion transmission, and rim losses do not occur. Thus, improved sensitivity is achieved with vacuum ionization methods as has been demonstrated with MALDI-time of flight (Tof) mass spectrometers relative to AP-MALDI and other API methods; the most typical use of MALDI is with Tof mass spectrometers operating at high vacuum. A method termed Super-AP has been implemented for increasing the sensitivity in ESI (Hiraoka and co-workers, J Mass Spectrom, 2016). Other means are the use of collisions (e.g., jet disrupters, gases, voltages, heat) for increasing sensitivity and applicability in traditional ESI methods (e.g., Smith and co-workers, Anal Chem, 2001). Collisions within the inlet tube, or prior to, and after the tube region have been employed for inlet and vacuum ionization. Both laser-based and laser-free methods such as e.g., MAI, laserspray ionization (LSI), and solvent-assisted ionization (SAI) and laser ablation SAI benefit from collisions. However, achieving the combination of high sensitivity and high throughput with any of these API, inlet and vacuum ionization methods has been problematic.

Vacuum MALDI is a popular ionization method for MS where a laser is used to ablate the sample which consist of analyte associated with a small molecule matrix compound that is present in large excess in order to produce gas-phase ions of the analyte. The laser beam must traverse from the laser at AP through a window that seals the vacuum of the mass spectrometer from AP and using lenses and mirrors strike the sample on the plate in a focused spot, typically <100 microns diameter. A motorized stage moves the substrate, onto which the sample is placed, so that different areas of the sample are illuminated. Mass spectra from various areas of the sample are summed to produce more representative chemical information contained in the obtained mass spectra with acceptable signal-to-noise (S/N); various means have been developed such as 'random walk", straight line" etc. in sampling a specific spot for best spectral averaging results (frequently 1000 shots are summed to give one mass spectrum or 'pixel in case of an image, achievable by expensive high repetition lasers). By moving, or rastering, the sample through the laser beam in a coherent manner and collecting mass spectra denoted by sample plate position, an image of the surface can be reconstructed for any m/z ratio mass analyzed and detected by the mass spectrometer and displayed in the mass spectra (typically thousands per surface, e.g., mouse brain tissue section). Such a vacuum system not only is slow to introduce samples for analysis (typically at least 2 min) due to the pump down time required for sample insertion and various sample stage movements, but is expensive because of pumping requirements and the necessary vacuum locks, vacuum chamber, and stage movement hardware (upkeep and maintenance problematic). Further alignment and focusing of the laser is also not trivial requiring high level of expertise and in some cases upkeep. As is the case with any laser, it makes a system more expensive. MALDI has also been demonstrated from AP performed on API mass spectrometers, but is less sensitive than vacuum MALDI which is typically performed on Tof mass spectrometers (e.g., Bruker, Shimadzu, and previously Thermo, Waters/Micromass, and Sciex) and less common from intermediate pressure associated with quadrupole-Tof (QTof) mass spectrometers (Waters and previously Thermo).

Common matrices used in MALDI are caffeic acid, alpha-cyano-4-hydroxycinnamic acid (CHCA), 2,5-dihydroxyacetophenone (2,5-DHAP), 2,6-dihydroxyacetophenone (2,6-DHAP), 2,5-dihydroxybenzoic acid (2,5-DHB), 2,6-dihydroxybenzoic acid (2,6-DHB), 5-methylsalicylic acid, salicylamide, 2,4,6-trihydroxyacetophenone, 5-bromo-2-hydroxybenzohydrazide, anthranilic acid, 4-nitroaniline, 3-hydroxypicolinic acid, nicotinic acid, sinapinic acid (SA), 6-aza-2-thiothymine, dithranol, and tetracyanoquinodimethane (TCNQ), among others, optimized for stability under vacuum; combination of matrices have been used, e.g. "super-DHB"). Sample preparation can be extensive using various matrices, solvents, and additives (acids, bases, metal salts, etc.) before satisfying results can be achieved. Relatively low volumes can be handled, e.g., 1 µl sample solution and 1 µl matrix solution mixed together and 1 µl dried od the mixed solution on the sample plate ('dried droplet method'). Singly charged ions are predominantly formed from AP and from vacuum which drastically limits MALDI on API mass spectrometers (e.g., FT instruments such as Orbitraps, as well as QTof's). With increasing mass (e.g., proteins) ions of more than one charge can be expected to be observed with MALDI. While MALDI-Tof can be routinely employed and for complex samples, once a satisfactory sample preparation and acquisition method has been established, limitations include chemical background (typical operation is with a mass range above m/z 800 limiting low mass applications such as drugs), undesired fragmentation (limiting applications to fragile compounds such as posttranslational modifications (PTM's), and chemical modifications), and 'hot spot" phenomenon (limiting reproducibility and quantification). To avoid the negative effect of the laser-induced chemical background in MALDI, e.g., laser desorption/ionization (LDI) or surface-enhanced laser desorption/ionization (SELDI) among others can be used.

Another vacuum ionization method which also uses laser ablation of a matrix is termed laserspray ionization (LSI). LSI is operational from AP and from vacuum (vLSI) and produces ESI-like multiply charged ions directly from surfaces, in some cases even using a MALDI matrix (e.g., 2,5-DHAP). LSI from AP typically requires a heated inlet tube, and when substantially heated (>350° C.), many compounds act as LSI matrices, but only a few at low inlet temperatures and in the absence of a tube or conduit. A difference relative to MALDI is that more volatile matrices are employed which produce a much higher abundance of multiply charged ions than observed with MALDI and similar to ESI. Improvements in so less assist in avoiding undesired fragmentation of labile functionalities such a phosphorylations or chemical modifications (e.g., c-mycine). LSI is also suitable for MS imaging. Only a few vacuum LSI matrices have yet been shown to provide good results from intermediate pressure and even fewer from high vacuum, all of which have in common that they require sufficient absorption at the laser wavelength employed. Matrices for use with (v)LSI have been discovered in searches for more volatility, contrary to MALDI matrices. The most successful matrix for vacuum (v)LSI is 2-nitrophloroglucinol (2-NPG). The benefit of use of a laser is a fast consumption of the matrix:analyte sample if the sample is homogenous enough and the laser repetition rate fast enough, as well as improved spatial resolution measurements. The requirement of the use of volatile enough matrices with commercially available vacuum MALDI source makes the applicability of vLSI narrow in scope, specifically because of the slow mechanics associated with the vacuum interlock to transfer the plate to the vacuum chamber. To mitigate this, binary matrices have been used to introduce components with sufficient volatility and sufficient stability as well as beneficial absorption characteristics at the laser wavelength. It is believed that such combinations also serve in enabling sufficient thermal energy provided to the matrix and analyte ionization progression. Laser ablation MAI and laser ablation SAI are potentially of greater utility because matching laser wavelength and matrix absorption is not a requirement for analyte ionization. The differences between these laser-based technologies and methods are that the matrix is required to absorb at the laser wavelength (infrared (IR), visible, ultraviolet (UV)) used with LSI and MALDI. 2-NPG matrix was used to analyze immunoglobulin G (IgG), an antibody, on a high vacuum MALDI-Tof mass spectrometer with improved results recorded for HCl addition, a strong acid, to the solution. Large molecules such as antibodies associated with health/disease are of potential relevance for drug development and pandemic testing (e.g., antibody detection such as IgG as one example in response to viral infections and associated 'surveillance', 'tracking', 'testing', 'monitoring', and pharmaceutical vaccine development in general).

Still another vacuum ionization method, as introduced above, is termed vacuum matrix-assisted ionization (vMAI), and like LSI and MALDI uses a matrix, but unlike LSI and MALDI does not require a laser; a laser can be used and one typical effects is faster removal of the matrix:analyte sample for the surface from where the sampling occurs. Instead, a matrix is used which spontaneously converts compounds of the sample associated with the matrix to gas-phase ions. This ionization process occurs during sublimation of the matrix, thus, vMAI matrix compounds have the property that they sublime under the conditions of the experiment. vMAI also produces multiply charged ions, but similar to LSI, conditions imparting energy into the ionized species reduces the charge states observed. A number of matrices for vMAI have been discovered, including but not limited to 3-nitrobenzo-nitrile (3-NBN), 2H-chromen-2-one (or also known as coumarin), 1,2-dicyanobenzene, 2-methyl-2-nitropropan-1,3-diol, 2-bromo-2-nitro-1,3-propanediol (also known as bronopol), isopropyl N-phenylcarbamate (or also known as propham), and methyl-2-methyl-3-nitrobenzoate, among others. Matrix combinations (e.g., MAI/MAI matrices, MAI/MALDI matrices, and MAI with compounds that are not matrices) and matrix(es)/additive combinations can be utilized to enhance the effectiveness of analyte ionization providing more specific or breadth and depth analyzing complex samples. Two such typical examples relate to the use of two known matrices and combining them in various molar ratios to produce desired results. vMAI has been used for low resolution imaging. Matrices for use with (v)MAII have been discovered in searches for more volatility, similarly to (v)LSI and contrary to MALDI matrices.

vMAI is one of the ionization methods central to the invention described herein, and has been shown to ionize proteins as large as bovine serum albumin (66 kDa) using an intermediate pressure MALDI source of a QTof without need of laser ablation. It is expected that higher masses will be readily applicable under the appropriate conditions. Examples of biomedical and clinical relevance include, as representative examples, drugs of abuse, specific metabolites, gangliosides, cardiolipins (e.g., associated with Barth Syndrome), carbohydrate-based vaccine candidates, Ebola related proteins, membrane proteins such as bacteriorhodopsin, various toxins, bacteria, fungi, and microbe colonies, among other biological samples. Yet others include synthetic materials such as monolayers, synthetic polymers, dendrimers, molecular ions of salts including but not limited to lanthanides and actinides such as uranium salts. Because of multiply charging, high performance mass spectrometers are readily applicable with well-known advantages such as mass accuracy, mass resolution and precision, as well as other advanced measurement technologies (e.g., electron transfer dissociation (ETD)) known to the practitioners of the art. Low chemical background allows ready detection of small and large molecules, some difficult or impossible by MALDI because of the typical large chemical background associated with the use of a less volatile solid matrix. As samples become increasingly complex (e.g., tissue, smears), high performance mass spectrometers, those available with API methods but not MALDI-Tof, become more critical, as does advanced data analyses for accurate and fast analyses. Open Mass Fingerprinting Framework (OMFF) used for classification studies is a software platform for processing, storage, and used to query fingerprint reference data obtained from mass analyses. Statistical methods such as principal component analysis (PCA) are also applicable and so are others known to the practitioners of the art.

The vMAI method was shown to be applicable using API sources (sometimes referred in literature to "MAI" or "AP-MAI" or "MATT" as in matrix-assisted ionization, matrix-assisted inlet ionization and matrix-assisted ionization inlet) by simply exposing the matrix:analyte sample to the gas flow at the inlet aperture so that the matrix:analyte association experiences the sub-AP of the inlet ("inlet ionization") producing gas-phase charged matix:analyte particles which through sublimation of the matrix leaves bare gas-phase analyte ions to be guided to the mass analyzer. Mass spectra from a wide variety of compounds and materials (including, as examples, urine, tissue, whole blood, and samples with high concentrations of salt(s) or detergent(s)) produce analyte ions with good sensitivity, even with the inlet at ambient temperature using a vMAI matrix. However, introducing MAI matrix:analyte samples to the inlet of an AP mass spectrometer has drawbacks, principle among these are prolonged observation of ions from introduction of a sample, carryover and inlet contamination with dirty and high concentration samples, as is not atypical with direct injection methods in MS (e.g., ESI, AP-MALDI). This limits the speed with which samples can be sequentially analyzed by MAI. The robustness to inlet contamination with dirty and salty samples is expected to be also over time problematic with sample introduction from AP. Several of the API methods cited above suffer to some degree carry-over, contamination issues, undesired fragmentation in solution (e.g., degradation during sample preparation) or in the gas phase (e.g., during ionization), undesired adductions, and unpleasant smells and odors associated with open air sources and methods.

Water and ice have been used in conjunction with AP-MALDI and variations thereof (e.g., MALDESI). Yet in other inlet ionization methods, termed solvent-assisted ionization (SAD, electrospray ionization inlet (ESII) and its variations, e.g., laser ablation SAI, are based on liquid matrix (e.g., simply the solvent used to dissolve or extract the sample in a vial or from a surface), produce ESI-like ions simply by passing a solution into a heated or cooled inlet tube linking higher and lower pressure regions. Analyte solution or the solid state version (e.g., ice) are converted to gas-phase ions using SAI. Compounds which are liquids at room temperature when frozen sometimes act as vMAI matrices ionizing molecules by exposure to sub-AP and without added energy. In fact, many compounds which sublime when placed in sub-AP conditions will produce gas-phase ions during the process of sublimation/evaporation. Addition of MAI matrices to solutions used with SAI have been shown to reduce the heat necessary for efficient ionizabuin through improving analyte intensity or lowering the chemical background or both. In ESI, effective means for desolvation of the liquid droplets are provided (counter gas flow, jet disrupter are examples) to prevent the solvent from freezing. Matrices, both solid or solvent (e.g., pure water) or combinations of both can be utilized from AP and vacuum to assist in analyte ionization at, near, elevated or freezing or yet extreme high or low temperatures of −80 to well above 600° C. Inlet ionization and more specifically SAI is well suited for remote sampling of surfaces and objects using an extended inlet tube although, as described above, concerns for robustness exist. SAI surface analyses of drugs and even cancerous tissue are examples of in vivo and ex vivo analyses.

Multi-ionization sources using API methods, including ESI, nanoESI, APCI, and atmospheric-pressure solids analysis probe (ASAP) are commonly available from mass spectrometer vendors employing API mass spectrometers. Interchangeable ion sources offer the intrinsic advantage of tailoring the right ionization method (e.g., small versus large molecules) to be used on the same mass spectrometer introducing less initial purchasing cost, footprint, and upkeep of more than one mass spectrometer over the lifetime of an instrument, among other advantages such as a more comprehensive chemical analyses. AP-MALDI (TransMIT, Germany; MassTech, USA), paper spray (Thermo), and DESI (Waters) are sources (sometimes add-on's) and methods which are usually standalone but are typically, but not always, interchangeable on the same mass spectrometer and may include venting the mass spectrometer (breaking vacuum). AP-MALDI has not been shown to be amenable for larger molecules, either because of ionization limitations or because of the mass range restrictions of API mass spectrometers for singly charged ions. Multi-ionization vacuum sources, on the other hand, are not commercially available, although intermediate pressure MALDI sources are available (Waters) which can be replaced by an ESI/APCI source. Breaking vacuum is a significant issue in terms (time and expertise, as examples) for interchanging a vacuum source, such as e.g., vacuum MALDI (vMALDI), with other ionization sources.

Commercial MALDI sources (AP, intermediate pressure, and high vacuum) align the laser in reflection geometry. Homebuilt dedicated modifications and sources have established the principle utility of transmission geometry MALDI-MS. While both reflection geometry and transmission geometry laser optics have clear advantages over each other, the reflection geometry in the currently available mass spectrometers are restricted for several reasons (mass accuracy and measurement precision affected in MALDI-Tof by slight variations of the sample plate position or thickness of the sample), and speed of analyses (unless expensive, high repetition lasers are used), among others. However, in reflection geometry the sample plate is not required to be transparent to the laser beam wavelength, adding flexibility to the measurement. In transmission geometry the sample plate must be transparent to the laser wavelength as is the case for MALDI and LSI, as examples. In terms of measurements, a definite drawback is the chemical background associated with MALDI (MALDI-Tof) which led to the development and use of surface methods such as surface-enhanced laser desorption ionization (SELDI), desorption/ionization on silicon of small molecules (DIOS), which, with further developments, is now called nanostructure-initiator MS (NIMS).

Many of the deficiencies of API methods are cured by introducing the sample directly into the vacuum of the mass spectrometer near the inlet to the mass analyzer (e.g., Trimpin and McEwen and coworkers, Rapid Commun. Mass Spectrom., 2016; Trimpin and McEwen and coworkers, Anal. Chem., 2018). The vMAI sample can be introduced to sub-AP using a probe such that the sample experiences a limited gas flow when the area near the sample is evacuated, and any matrix sample dislodged from the substrate is remote from the lens elements and ionization region. Thus, matrix related instrument contamination is essentially eliminated and carryover from any sample removed from the probe is not observed at low gas flow. Instead, the matrix sublimes from the probe surface leaving any nonvolatile compounds (including, as one example, salts contained in samples) which are not ionized remaining on the probe to be removed from the instrument when the analysis is complete. The result from inserting the matrix:analyte sample on a probe tip directly into the inlet vacuum chamber is a steady emission of gaseous analyte ions over a period of time. The time of ionization is determined by the rate of sublimation of the matrix and the amount of matrix placed on the probe. Conditions, which accelerate sublimation increase the ion abundance and shorten the overall time ions are produced and may include conductive and radiative heat. Conditions that slow the sublimation (e.g., cooling), stretch the ion formation over a longer period of time (beneficial for e.g., MS/MS), and as shown below in this invention for excellent control leading to the ability of (ultra-)fast acquisitions and (ultra-)high throughput source and applications. All matrices of this spontaneous ionization method sublime in vacuum near room temperature. In other inlet and vacuum ionization methods evaporation has to play a role; whether sublimation or evaporation, the process described is to remove (desolvate) matrix, solid, or liquid, from charged and neutral particles to transport the analyte into the gas-phase as bare ions for analysis by mass spectrometry or ion mobility spectrometry or others. It was been shown that (v)MAI is applicable one a broad range of instruments from (ultra)high performance to portable and from small to large molecules, and directly from their natural environment.

Sublimation appears to be one driver of this ionization process, but not in the traditional sense of subliming compounds. Instead, minute submicron particles are believed to be splintered from the surface during sublimation and these particles are charged and carry analyte into the gas phase. Compounds known to triboluminescence, a charge separation process, and sublime under the conditions of the experiment produce high analyte ion abundances; 3-NBN, 1,2-dicyanobenze, coumarin, propham, bronopol, amongst other MAI matrix are examples. More specifically, 3-NBN ionizes well drugs, peptides, and proteins, monolayers of inorganic complexes in the positive detection mode whereas uranyl salts ionize readily using a binary matrix mixture of 3-NBN and CHCA in the presence of nitric acid in the negative mode detection. The matrix 1,2-dicyanobenze ionizes preferably lipids (e.g. gangliosides, cardiolipins), potential synthetic magnetic resonance imaging agents while bronopol matrix readily ionizes carbohydrate-based vaccine candidate. Over 40 matrix compounds that spontaneously produce ions when exposed to sub-AP, with varying ionization efficiencies, have been discovered. Unlike other matrices used in MS (e.g., CHCA in MALDI, acetonitrile or methanol in ESI), some of the SAI (e.g. pure water) and MAI matrices are safe and even edible (coumarin) or used in consumer products such as bronopol making even in vivo applications and temporal resolution measurements possible and in principle from living species. The spatial resolution is that of the sample spot (area exposed to the matrix) analyzed by vMAI without the use of a laser. While this ionization method is highly sensitive, only a minute amount of nonvolatile material is removed during the ionization process. Thus, carryover between subsequent samples as well as instrument contamination for dirty and high concentration samples is essentially eliminated. This approach may be the most robust MS ionization method available. However, while probe introduction has a number of positive attributes, it is not easily and inexpensively made to be fast and automated, and it is also not easily made to be multi-mode ionization. Expensive robotics could be used to introduce samples to vacuum using a probe method, but achieving high throughput would be difficult.

The devices and methods disclosed herein have important advantages relative to methods of sample introduction into vacuum conditions currently used with vacuum MALDI, vMAI, or vLSI: (1) The methods of this disclosure do not rely on an additional pumping stage in addition to pumping already available with API mass spectrometers, although someone trained in the art can readily retrofit such capabilities for certain configurations with expected higher pumping requirements. In fact, less pumping capacity is required for the approach disclosed herein. (2) The time required to expose a single sample to the vacuum ionization region of the mass spectrometer on a sample plate device is rapid, reducing the time from as much as minutes with some commercial systems which use vacuum locks to as little as two to three seconds. (3) The disclosed inventions can be used to rapidly sequentially acquire mass spectra from different samples while manipulating from AP the substrate that holds the samples. (4) The device of the disclosed invention can be used with (retrofitted to) commonly available commercial mass spectrometers designed for API or with dedicated new mass spectrometer designs. (5) The disclosed method is robust in avoiding carryover and instrument contamination. (6) The disclosed approach is inherently simple and low cost not requiring a separate vacuum chamber in which to place the sample plate before introduction to the ionization region. (7) The disclosed device allows multi-mode ionization by the methods of vacuum ionization including matrix-based methods vMALDI, vMAI, and vLSI, as well as matrix-free methods such as LDI, SELDI, DIOS, and NIMS, as examples. (8) The apparatus also supports ESI, nanoESI, APCI, APPI, ASAP, DESI, and acoustic ionization methods in addition to "inlet ionization" methods without having to vent the instrument when switching between ionization-modes (to be precise, the first time switch to this apparatus will require the venting of the analyzer and thereafter the various ionization modes can be engaged and used by simple replacing the sample plate device, described in detail below). (9) In (v)MALDI and (v)LSI, laser ablation can be by transmission geometry where the laser beam ablates the sample from the backside of the sample plate for convenience, speed, and spatial resolution, or reflection geometry laser alignment where ablation is frontside (on the side of ion transmission). Reflection geometry laser alignment is key for samples, conditions, and requirements where the laser cannot or should not have to penetrate through the sample support or the entire sample itself, e.g., metal, certain glass (wavelengths), thin layer chromatography plates, micro- and nanostructured surfaces, as a few examples. While the laser is a convenient analytical tool used from ultraviolet (UV), visible to infrared (IR), other energy beams can be also implement with this apparatus, as known to practitioners. The methods associated with vacuum ionization are inherently more sensitive, additionally to robustness relative to traditional methods of ESI, AP-MALDI, APCI and related so-called ambient ionization methods, as well as inlet ionization methods including MAI, SAI, nanoSAI, laser ablation MAI, laser ablation SAI, LSI, among other variations. API method such as ESI however, have some strengths (e.g., direct coupling with liquid chromatography (LC), capillary electrophoresis, native MS), and can be used with this multi-mode apparatus. Ionization reproducibility and quantification are more readily achieved with vMAI, because the well-known hot spots issues in MALDI are not present in vMAI.

As will be described in more detail, the requirement for this revolutionary simple approach is as little as a flange to seal the vacuum of the analyzer from AP having a channel, hole, or conduit therethrough which connects substantially AP with the first vacuum stage of an analyzer (which may be a mass analyzer, or mass spectrometer, an ion mobility analyzer, or charge detector, as examples, or combinations, and in the following referred to in the generalized form of "mass spectrometer" or "mass analyzer") and a substrate, or plate, for holding samples, and which when placed over the channel in the flange device substantially seals the lower pressure in the analyzer from the higher pressure outside the analyzer and substantially at AP. The surfaces of the sample plate device and flange device create a near perfect (hereafter called substantial) vacuum seal. By using flat or curved surfaces, the sample plate device can slide over the flange device in the x and/or y directions, thereby exposing adjacent samples (more precisely adjacent wells containing samples). Note that wells that hold samples can be either indentations in a sample plate or channels through a spacer plate which is in intimate contact with a sample plate which may not have indentations, as for example glass microscope slides. Only one sample, typically composed of a matrix and analyte, is sequentially aligned with the channel in the flange at any point in time. Sliding the surface of the sample plate device over the surface of the flange device occurs without loss of the operational (or sometimes called "operating") pressure in the analyzer. The operational pressure being defined as being at or near the pressure the analyzer was designed to operate. A key feature is that only one sample is exposed to the low pressure region while all other samples remain at or near AP so that sequentially exposing samples to the low pressure region essentially only adds the gas, usually air, encapsulated in the well or channel where the sample resides, as known to those skilled in the art. Examples include but are not limited to adding a large opening that will require additional pumps, e.g. for use with larger tissue sections. Yet one can also implement two or more inlets (e.g., for certain applications including but not limited to calibration and accurate measurements by adding the mass or ion mobility calibrant through the additional port (inlet) or for certain gases, e.g. for H/D exchange or electrons transfer dissociation (ETD) reagent) Modifications to this simple concept are described which allow high throughput analyses of multiple samples contained in one position (especially applicable with less volatile matrices making up samples or matrix-free samples) as well as molecular imaging of surfaces and prolonged ionization to allow multiple experiments such as data dependent fragmentation as well as quantification known to those practiced in the art. Ionization can be initiated with and without a laser, without and with high voltages, and with or without a matrix, with or without heat/freezing while the commercial abilities are not sacrificed such as, but not limited to, MS, MS/MS and ion mobility spectrometry (IMS) applications, including LC, imaging, mass resolution, mass accuracy, ETD, multiple reaction monitoring (MRM), collision induced dissociation (CID), In-Source Decay (ISD) fragmentation, amongst others known to the practitioner. The multi-mode ionization apparatus of this invention can be readily retrofitted on existing or new mass spectrometers and the user, including novices, can choose the appropriate ionization method for the specific task. Switching ionization methods is within seconds and steps and protocols can be coupled with robotics for streamlined and remote sampling, as well as data analyses.

The invention described below can be used to assess inorganic salts and complexes, biological, clinical, biomedical, forensic, environmental, and agriculture related compounds, drugs of abuse, pharmaceuticals, and/or oil/petroleum samples, synthetic polymers, dendrimers, amongst others, as well as for identifying microbes as occurs in microbial infections, bacterial and viral pathogens, cancers, and biomarkers for a variety of diseases ranging from small to large molecules. Tissue imaging, monolayer analyses, and single cell analyses provide detailed information from surfaces that relate to a specific disease and disease boundaries. It should be understood that these uses are meant to be examples and not inclusive uses of the novel ionization apparatus based on vacuum ionization and ready access with inlet and traditional ionization methods for chemical information obtained nearly instantaneously. The advantages of this source for these analyses include speed of analysis, cost effectiveness, simplicity of operation, and robustness to carryover and contamination. The exceptional flexibility makes this multi-ionization source readily adaptable to how a sample is provided to a facility, or more specifically, to the mass spectrometer, e.g., glass plate, metal plate, thin layer chromatography (TLC) plates (1-dimensional (1D) or 2-D), gels (1D- and 2D- (sodium dodecyl sulfate-polyacrylamide gel electrophoresis (SDS-PAGE)), Western blots, swabs, and parts of leaf, hair, fruit, vegetable, or meat, as well as plastic and polymers including films, and sections biological tissue. Some of these materials may preferably be most directly provided to a well that maybe covered by a mesh to ascertain containing solid material in the well. Potential uses are in forensics, clinical, homeland security, doctor's offices, consumer control, food safety (e.g., meats, fruits, vegetables), energy and environmental oversight, as examples.

Quantification is rapidly achieved through the standard addition methods and even more rapidly through relative quantification. Easy, rapid, and accurate detection "on demand" and at high speed and sensitivity represent significant improvements in many analyses, and especially healthcare outcomes and costs. Low cost to manufacture and operate are especially important for measurements "for the masses" ("democratization") such as those desired or required during physician visits, airport screening, or health crisis such as emergency and operating rooms, as well as epidemics and pandemics, and monitoring cancer progression, safe and timely drug developments, homeland security, including energy because of its unique abilities to ionize small and large molecules for rapid and high throughput analyses, as in e.g., serosurveilance. Similarly, simple sample strategies including (filter) paper, meshes, needles, smears, and swabs, as well as other means known to practitioners can be directly applicable but may need enrichment (extraction and concentration) or even necessitate cell cultures and growing efforts (for some of the more difficult bacteria, as just one example). Other biological materials can be monitored rapidly and accurately for type and stages of cancers (blood, tissue including biopsies from organs), especially effective using a machine learning approach for fast and reliable interpretation including chemometric analysis. This is particularly true because of the robustness of the source and method afforded by the ionization apparatus of this invention providing complementary ionization and chemical coverage of a material (sample) analyzed, in addition to the simplicity associated with the new ionization processes in MS, and the outstanding sensitivity and chemical molecular information achievable with MS using the apparatus and methods of this invention disclosed in more details in the following.

SUMMARY OF THE INVENTION

The disclosed systems and methods relate to a method to achieve rapid exposure of samples sequentially to the vacuum of an analyzer which may be a mass spectrometer, ion mobility spectrometer, charge detector or other instruments relying on gaseous ions. The method involves a flange device which seals the vacuum conditions of the analyzer from atmospheric pressure (AP) outside the analyzer. A channel in the flange device linking the higher pressure region outside the analyzer with the lower pressure region of the analyzer is covered by a sample plate device which when in intimate contact with the flange device achieves a substantial seal to maintain operational pressure in the analyzer while sliding the sample plate device across the flange surface to align the samples on the sample plate device with the opening of the channel and in fluid communication with the vacuum in the analyzer. Samples on the sample plate device and be aligned with the channel opening is less than one second each and sample plate devices can be interchanged in approximately 2 seconds without disrupting the operational vacuum of the analyzer. Samples aligned with the opening of the channel in the flange device and exposed to the lower pressure of the analyzer can be ionized by a multitude of low and high energy means leading to complementary ion coverage and molecular information. More particularly, the present invention relates to the creation of an ionization apparatus for use as an ion source in mass spectrometry (MS) and ion mobility spectrometry (IMS). The present invention is capable of (i) fast, sequential ionization of multiple samples leading to high speed chemical and structural analyses of samples by a combined means of utilizing the simplicity of sample manipulation from AP with the sensitivity and robustness of vacuum ionization while minimizing the gas load on the vacuum system; (ii) multiple ionization methods with and without the use of a laser or a matrix and encompassing rapid switching between the various ionization methods operational under sub-AP (vacuum) and including matrix-assisted ionization (MAI), laserspray ionization (LSI), matrix-assisted laser desorption/ionization (MALDI), laser desorption/ionization (LDI), desorption/ionization on silicon (DIOS), nanostructure-initiator MS (NIMS), and surface enhanced laser desorption/ionization (SELDI), enabling the characterization of small and large molecules from the solid state, in certain cases liquid states (SAI) containing MAI matrix directly from the surface, and yet other direct means from surfaces including thin layer chromatography (TLC) plates, sodium dodecyl sulfate-polyacrylamide gel electrophoresis (SDS PAGE) gels, smears, and swabs; (iii) multiple ionization methods with and without the use of a high voltage or a matrix and operational from atmospheric pressure (AP) and including electrospray ionization (ESI), nano-ESI, desorption-ESI (DESI), atmospheric-pressure solids analysis probe (ASAP), direct analysis in real time (DART), AP chemical ionization (APCI), AP photoionization (APPI), matrix-assisted ionization (MAI), laserspray ionization (LSI), solvent assisted ionization (SAD, nanoSAI, electrospray ionization inlet (ESII), AP-MALDI, laser ablation MAI, laser ablation SAI, as well as acoustic and vibrating methods enabling the characterization of small and large molecules from solution including with liquid chromatography (LC) and surface interrogation devices. Switching between vacuum ionization and ionization from AP using the present invention is accomplished in less than one minute; (iv) applying multiple ionization methods in a rapid fashion to the same sample using the same mass spectrometer, often leading to a significantly more detailed view and understanding of the chemical composition, and applying a single ionization method to multiple samples to achieve high throughput; (v) using mass spectrometers designed for atmospheric pressure ionization (API). The invention can be retroactively interfaced with existing mass spectrometers achieving full use of capabilities such as collision-induced dissociation (CID), multiple reaction monitoring (MRM), electron transfer dissociation (ETD), and imaging known to those practiced in the art, or the invention can facilitate the creation of new mass and ion mobility spectrometers CDMS and other instruments associated with gaseous ions, including portable, fieldable, clinical or forensic instruments, as examples.

The objective of the present invention is the successful implementation of an apparatus through innovations in systems and methods to provide a simplified high sensitivity, robust, and widely applicable ion source with the ability to transfer samples residing on a substrate from AP to sub-AP of the mass spectrometer inlet chamber requiring typically a few seconds and in some configurations enabling rapid analyses of chemical and molecular composition of a wide variety of samples (materials). In particular, the apparatus of this invention allows ionization by a variety of vacuum ionization methods, some accessed by simply using the appropriate matrix under vacuum conditions without passing the sample on a substrate through a 'vacuum lock', so that ionization can be initiated within a few seconds from a sample residing on a sample plate device at or near AP. Multiple samples on a substrate (sample plate device) can be acquired in as little as, or less than, 1 sec/sample, and inserting the first sample of an adjacent sample plate holding a multitude of samples takes as little as 2 seconds. This is in full scan mode, contrary to other high throughput analyses using primarily ESI-MS such as the ECHO system. Surfaces such as a biological tissue, cell cultures, and synthetic films can also be analyzed and if desired imaged with or without a laser using this multi-mode source. Low sample volume (nanoliters) is applicable. Samples can be re-analyzed by spotting with the same or another matrix or matrix or matrix additive combination preserving precious sample if desired, e.g., vMAI and MALDI. Quantitative measurements are readily achievable. Ever more volatile solid matrices are now applicable, positively affecting speed of analyses as well as providing "cleaner" mass spectra (no fragmentation or adductions). Both positively and negatively charged analyte ions are formed and can be analyzed by switching polarities within seconds or less from each other depending on the mass and mobility analyzer employed. The wealth of information obtained is significantly increased and improved because of the low chemical background, detection of low and high mass compounds simultaneously, speed, and robustness at high resolution and accurate mass.

This is the first vacuum ionization source hyphenated with advanced fragmentation technologies such as ETD, electron capture dissociation, and photodissociation for protein sequence information encompassing sequence alterations (isoforms and posttranslational or chemical modifications of e.g., certain amino acids of certain proteins) using multiply charged ions produced by vMAI. The more typically used CID is readily available for structural analyses of multiply- (preferred, e.g., vMAI) and singly-charged ions (limited applicability, e.g. MALDI) formed in any of the ionization modes of this new source, both in the positive and negative modes of detection. Because the source requires less pumping capacity than typically used with API mass spectrometers, it readily allows utility with portable and field-moveable, or "compact" or "integrated" mass spectrometers which typically have lower pumping capacity. (Ultra-)high resolution mass spectrometers provide the typical mass resolution and mass accuracy measurement abilities, if not in some cases with improvements. Additional separation power and structural information is also obtainable through coupling with advanced mass analyzer technologies and associated measurements approaches such as IMS-MS, IMS-MS/MS, $MS^E$, MS/MS, and $MS^n$, and in some cases provides improvements in drift time resolution and peak capacity, and structural information, especially when multiply charged ions are formed enhancing e.g., drift time resolution in same cases and generally peak capacity and sensitivity and dynamic range.

The sample preparation is typical of that used for MAI, MALDI, and LSI. The applied and consumed analyte and matrix volumes, respectively, are in the order of 0.1 to 2 µL but may be more or less. More specialized equipment and approaches may enable sub-nanoliters volumes. Various solvents are applicable including water, methanol, acetonitrile, ethanol, propanol, isopropanol, dimethylformamide, tetrahydrofuran, dimethylsulfoxide, dichloromethane, and others in pure form or as solvent mixtures. Higher dielectric constant materials (e.g., formamide solvent) have been shown to improve results in some cases, especially of vMAI, possibly through improvements of dissolution, although the dielectric effect may be also directly enhancing the analyte ionization process. Similar improvements are expected with the dielectric constant materials and other coated samples plates. Matrices can be applied in a dried, droplet, thin layer, pre-coated, and solvent-free manner, known to practitioners. Other additives such as acids and bases as well as metal salts are applicable and can enhance the analyte ion abundance or lower the chemical background. Additives such as ammonium salts have been used to further lower the chemical background for an already low chemical background ionization method such as vMAI for both small and large molecules. Metal salts are used in some cases to ionize less basic compounds through metal cation attachments, e.g., polymers and dendrimers. Heretofore unknown binary matrix combinations have also been applicable, such as addition of volatile compounds such as one of the methyl nitrobenzoate isomers, to a known vMAI matrix to speed sublimation and thus analyte ionization. Addition of MALDI matrices such as CHCA with vMAI matrices such as 3-NBN have been shown to increase the signal intensity for some proteins and inorganic salts including biohazardous and radioactive materials, as examples, using vMAI. Even manually handled, the potential for exposure to the sample can be performed in a safe way, although the operation is preferably automated and executed by robotics support. Likewise, MAI matrices have been mixed with MALDI matrices such as 2,5-DHAP to aid imaging.

Because the addition of acids is not typically helpful with vMAI, this ionization mode has been shown to be especially helpful for pH sensitive compounds (chemically labile, and more specifically acid labile modifications), contrary to, e.g., ESI or MALDI. Similarly, photolabile compounds are preferably measured with the vMAI mode, instead of the vMALDI, a method that is frequently too harsh leading to undesired analyte fragmentation. Extension of the mass range on API mass spectrometers can be addressed by switching from vMALDI mode to vMAI mode to produce multiply charged ions. Charge states can be to a certain degree also manipulated by voltages, heat, and the matrix or matrix combination applied. Alternatively, switching to a different quadrupole (e.g., 8K to 32K in case of Waters QTof SYNAPT series) or a different high mass capability mass spectrometer (e.g., Thermo Orbitrap series) can be used to extend the mass range of vMALDI. Complex samples may preferably be analyzed in vMALDI mode, instead of vMAI, reducing the complexity of multiply charging to an already complex mass spectrum (vMALDI produces mostly singly charged ions). Field analyses is enabled through the limited pumping requirements associated with e.g., a portable mass spectrometer. For MS/MS analyses a simple switch to vMAI is preferred to that of vMALDI for improved intentional fragmentation using traditional fragmentation technologies such as CID or advanced fragmentation technologies such as ETD. Similar advantages relate to the use of multiply-charged ions, as in vMAI and vLSI modes, for improvements in IMS utility (e.g. drift time resolution, peak capacity, sensitivity, and dynamic range gains). While the source assembly of this invention is capable of multiple vacuum ionization methods, significant cost can be eliminated and simplicity of operation gained by not equipping the apparatus with a laser and solely utilizing vMAI mode in a standalone system, such as a portable mass spectrometer or ion mobility analyzer. Yet in other certain tasks (e.g., spatial resolution) a standalone MALDI or LSI mode MS imaging system might be preferred. There are additional flexibilities such that e.g., operation of the apparatus enabled by systems and methods can be a single sample or thousands of samples in consecutive fashion (e.g., (ultra-) high throughput), manually or preferably automated and assisted by robotics (e.g., collaborative robots within a laboratory setting, while less human-friendly robots can be employed for more rugged applications and terrains).

The herein disclosed invention encompasses a means of exposing a sample to the vacuum of the mass spectrometer, a means of ionizing the sample to produce gas-phase ions, and a means of transmitting the ions thus produced to the ion optics of the analyzer. The systems and methods provide for lower cost ion source and mass spectrometer construction, is robust relative to carryover and instrument contamination, is simple to operate, highly sensitive, and provides a rapid means of ionization using vMALDI, vLSI, or vMAI and with a simple switch, without venting the instrument, to include an inlet tube for e.g., ESI, SAI, or ESII, among other vacuum and inlet ionization as well as other API methods. No current ionization technology encompasses these attributes. Ionization here is defined as transferring compounds from a solid or liquid state into the gas phase as ions and may include charged matrix:analyte particles as intermediates and their desolvation through processes associated with sublimation or evaporation to obtain the 'freed' gaseous analyte ions.

There is provided a sample introduction means comprised of a flange device to substantially seal the inlet vacuum chamber of a mass spectrometer from AP. The flange device has a channel which aligns with the ion transmission path of the inlet chamber so that the inlet chamber is in fluid communication with a sample when in operation. Ions and charged particles from the sample pass through the channel in the flange device, the inlet chamber and enter the ion transmission guide or focusing elements of the mass and other analyzers. A valve plate when placed over the channel in the flange device on the higher pressure side substantially seals the inlet chamber from the higher pressure gas on the opposite side of the flange, thus maintaining the vacuum of the analyzer. The sample plate device may also be a sample plate having an edge, which by pressing against a valve plate or another sample plate with a similar edge can displace the valve plate or sample plate by sliding in an appropriate x,y-direction so that the new sample plate covers the channel in a manner which provides the ability to expose individual samples to the opening of the channel sequentially while other samples on the plate are at AP and the inlet chamber is substantially sealed from AP. The edges of the sample plate devices may be flat. The sample plate has at least one indention, or well, into which a sample(s) can be placed so that the sample is not in contact with the flange device surface when the surfaces of the sample plate device and flange device are in intimate contact with one another. For typical use, only one indention can be over the channel in the flange device at any one time, but adjacent indentions can be moved sequentially over the channel to expose subsequent samples to the vacuum of the inlet chamber so that the produced gas-phase ions or charged matrix:analyte particles can travel to and through the analyzer. For advanced applications (or instrument maintenance), two (or more) inlets or two or more wells are exposed to sub-AP and ions analyzed simultaneously for reasons such as instrument calibration, lockmass for accuracy, and reagents gases for ETD, as examples. Either gas flow or voltage, or both can be used to transfer the gas-phase ions and charged particles to and through the inlet chamber and ion transmission or focusing devices known to those practiced in the art can aid transfer while maintaining a narrow ion path. Because analyte ions may be associated with matrix upon leaving the matrix: analyte surface with either vMAI or vMALDI, obstructions, voltages, heat/cooling, gases, and other means of removing matrix for efficient desolvation of the charged clusters to increase the number and likely variety of analyte ions formed, transmitted to and through the analyzer, known to practitioners of the art, can be used in the vacuum source of the present invention for improvements in sensitivity and breadth of rapid and in-depth molecular analyses, as well as for imaging. Some of these post-plate conditions in particularly benefit the vMALDI mode, and any other ionization modes dealing with less volatile conditions under certain conditions, because of the relatively involatile matrices employed in MALDI.

For vMALDI ionization, a means of delivering energy, typically a focused laser beam (a different energy beam [type, shape, and profile] is applicable with this arrangement) at a wavelength absorbed by the matrix, to the sample is required to produce gas-phase analyte ions, but for vMAI, analyte ions from the sample are spontaneously produced when the sample is exposed to vacuum (sub-AP) conditions. For LDI and other direct ionization methods, no matrix compound is added to the sample (matrix-free analyte ionization methods). In transmission geometry, the focused energy beam such as a laser beam can be directed at the sample through an optically transparent, e.g., silica glass or quartz plate such as a microscopy slide, at an angle ranging from ca. 25 to 90 degrees relative to the plane of the plate or in reflection geometry by passing the laser beam through, e.g., the channel in the flange device or a designated specific ion path. The sample plate and the adjacent flange area can be cooled or heated. In general, a more focused laser beam provides high spatial resolution analyses and defocused laser beam limits the hunt for hot spots and improves relative quantitation. Alternatively, fiber optics cable can be used with some lasers to transfer the laser energy to the sample in either transmission or reflection geometry. Fiber optics introduces simplicity and easy safety implementation against laser exposure of the operator. Transmission geometry has the advantage of speed (one-shot-one mass spectrum or pixel in an image, easy-aim-and-fire-option of areas of interest, fast alignment). Reflection geometry has the convenience of using sample plates opaque to the laser wavelength. The thickness of a sample is not a limiting factor such that an object can be placed into the position and the laser in reflection geometry engaged. The laser wavelength is free in choice just as with any MALDI experiment, and by extension with (v)LSI by using the appropriate matrix or matrix combination. While ultrafast lasers are applicable (kHz repetition rates), in transmission geometry more affordable lasers (e.g., $N_2$ laser, 337 nm) can be readily utilized without significant penalties in speed. $CO_2$ and UV, deep UV, visible, IR and far IR lasers are applicable under certain conditions. Spatial resolution can be improved through more focus laser beams, or through, e.g., oversampling strategies, known to the trained practitioners. It is conceivable that continuous lasers and not only pulsed lasers are applicable with continuous analyzers such as QTof's and Orbitrap API mass spectrometers, as is the case with LC's continuous supply of sample and continuous ionization by e.g., ESI.

While the above description describes a simplified arrangement of the flange device and sample plate device, another preferred embodiment is somewhat more involved but also more flexible. Instead of the sample plate devices being a valve plate or sample plate covering the channel in the flange device, a spacer plate with at least one channel therethrough can be placed directly over the channel on the AP side of the flange device. A part of the spacer plate without channels when over the channel in the flange can act as a valve substantially sealing the inlet chamber from the higher pressure AP region. However, when a channel in the spacer plate is over the channel in the flange, a sample plate must be in position and in intimate contact with the spacer plate on the AP side to secure a substantially gas-tight fit. In this case, the sample plate device consists of a spacer plate and a sample plate in which the sample plate aligns with the spacer plate in a fixed position and the surfaces of the spacer plate and sample plate when in intimate contact with one another form a substantial vacuum seal. The spacer plate may have multiple channels therethrough. In the case of a spacer plate, the sample plate may, but does not need to have indentations because the sample(s) applied to the sample plate can be positioned to fit within the space of the channel(s) of the spacer plate when the sample plate is in intimate contact with the spacer plate. The sample plate resides on the AP side of the spacer plate while the other side of the spacer plate is in intimate contact with the flange device surface. Sliding the sample plate device containing a sample plate and a spacer plate allows the spacer plate channels to sequentially align with the channel in the flange device and therefore expose any sample associated with a spacer plate channel to the lower pressure of the inlet chamber. Gas-phase ions of analytes in the sample are produced by striking the sample with an energy pulse, typically a laser beam, or if using a vMAI matrix as part of the sample, gas-phase ions are spontaneously produced when the sample experiences lower pressure as a result of being in fluid communication with the vacuum of the analyzer. The sample plate can be temperature controlled, below and above room temperature, to tune for best results and wider applicability with different matrix compounds and matrix mixtures and additives if desired. However, ionization optimizes at ambient temperature for a number of vMAI and MALDI matrices. The ion transfer region within the inlet chamber may also be heated to effect loss of matrix from charged particles (desolvation). The heat may be convective or radiative (e.g., second energy beam, laser or IR lamp, are examples).

Further, the sample plate device can be placed over a valve plate as long as the surfaces between the valve plate and flange device, valve plate and spacer plate, and spacer plate and sample plate all maintain operational pressure in the analyzer. In this case the valve plate is typically 1-4 mm in thickness, made of metal or polymer with a channel therethrough and the ability to slide along the face of the flange device to open the channel in the flange device only when the hole in the valve plate is over the channel in the flange device. The hole in the valve plate is typically approximately the size of the channel inner diameter, but may be larger or smaller for specific purposes. The plate which substantially seals the channel in the flange device is held to the face of the flange device on the high pressure side by the pressure differential created by the pumps of the analyzer system, although, in practice, slight pressure is typically applied to the sample plate device to assure a good vacuum seal.

Ion transfer optics used can be those associated with current mass spectrometers or are further optimized for additional improvements for specific vendor and analyzer types. Examples include but are not limited to multipole ion transmission devices including quadrupole, hexapole, and octapole, lens elements such as tube lens, S-lens, and Einzel lens, and ion funnels including straight, curved, and humpback. Collisions with surfaces and gases (pressure and gas flow, and gas types), voltages (preferably low voltages) and heat (preferably low heat) can be utilized for improvements in loss of matrix from gas-phase charged particles through improvements in desolvation of charged clusters leading to enhancements in analyte ion abundance at the detector and therefore enhancements in sensitivity of the instrument and dynamic range of the experiment. Physical obstructions can be achieved by simple off axis ion transmission path, mesh (es), wire(s), plate(s), rod(s), ball(s), with and without voltage applied and with and without heat applied. Heat can be convective or radiative.

The surfaces of the flange device, spacer plate, and sample plate when held together by a positive force, including the pressure differential, secures a pressure in the inlet chamber that is commensurate with the operation of the analyzer and simultaneously allows the channel in the flange to be preferably greater than 2 mm diameter and allows the sample plate or sample plate plus spacer plate to be moved in the x or y directions manually or using a motorized stage to sequentially expose samples to the vacuum of the mass spectrometer, and in the case of vMALDI or vLSI or matrix-free methods (e.g., LDI), also to the laser beam. A preferred embodiment aligns sample in a straight line so that movement, manual or automated, of the sample plate device relative to the channel in the flange device needs only be in one direction. Alternatively, the laser beam (optics) can be arranged to move relative to the stationary sample plate. This still allows an unlimited number of samples to be sequentially exposed to the ionization region because multi-sample plate devices can be interchanged in ca. 2 seconds. Exchange of multi-sample plates can involve multiple plates being in a grove which has the channel in the flange device centered within the grove and sample plate devices with edges which abut to form a substantial vacuum seal. In another embodiment, a two-dimensional arrangement of samples on the sample plate device allows a larger number of samples to be placed on a single sample plate, but also requires movement of the plate in both the x and y directions while maintaining the operational pressure of the analyzer. A two-dimensional sample plate device is best manipulated with robotics. Automation and robotics are simplified by being entirely at AP.

Charge states can be adventitiously manipulated to specific outcomes from low to high charge states through parameters typically involving energy input such as voltages, heat (cooling), and laser(s). Singly or low charge states are advantageously used for highly complex sample compositions such as protein digests (e.g., bottom-up proteomics) and increased charge states are necessary with increasing size of the analyte (e.g., intact proteins, including chemically modified or post translational modifications). High charge states are preferred for use of advanced MS/MS technology (e.g., electron transfer dissociation (ETD) and improvements with traditional intentional fragmentation (e.g., collision induced dissociation (CID), in source fragmentation). Using vMALDI mode, singly charged ions are most prominent. In any case, with the multi-mode ionization apparatus source there are several ways to achieve the desired charge states and ion duration including mixed matrices. As long as the mass analyzer range supports the specific charge state(s) (high mass analyzers in case of 'lower' protein charge states obtained in the MALDI mode), the manipulation to less charged protein ions is an excellent addition or alternative for improving mass measurement abilities because of reducing undesired mass-to-charge (m/z) overlaps as well as increasing peak capacity in m/z and drift time dimension and in particularly in drift time (m/z) (also called "nested dataset"). Some of these interpretation issues can be also solved through use of deconvolution software while (ultra-) high resolution measurements allow using the isotopically resolved signals of the ions, excellent agreement is found with portable instruments using the average mass instead. Computer aided statistical analyses can be used to aid the data interpretation to obtain accurate and nearly immediate results.

The multi-mode ionization apparatus described herein provides an advantageous means for introducing multiple consecutive matrix:analyte samples on a substrate sequentially to the vacuum of an analyzer such as a mass analyzer or ion mobility analyzer or CDM detector or other instruments associated with gaseous ions without need of a vacuum lock for robust, highly sensitive, automated, and high throughput analyses. The different ionization modes not only form different charge states but show the ability to ionize different analytes, in some cases preferentially and in others solely making it possible to see much deeper and broader into the chemical composition of a sample. This is achievable within seconds from each other (different ionization modes of either the same spot or an adjacent spot and in full scan mode). A unique feature of the apparatus is that the mechanism of delivering a sample in alignment with the channel in the flange device is at AP making the apparatus less expensive and more robust than methods requiring the apparatus that moves the sample plate to be under sub-AP conditions and enclosed in a vacuum chamber as in current vacuum MALDI sources. The sample ionization region is retained at sub-AP by confining the region in which the sample resides between the sample plate, an optional spacer plate, and the flange device in fluid communication with the analyzer and substantially sealed from at or near atmospheric pressure. The air volume in the region where a single sample resides is confined by, e.g., the sample plate, the channel in the spacer plate, and the flange device surface before the sample is aligned with the channel in the flange device. When the spacer plate channel is moved over the channel in the flange device that leads to the vacuum of the analyzer, gas in the spacer plate channel is pulled into the ion transfer region and into the analyzer. The gas load is sufficiently small relative to the ion transfer region that the pressure gauges hardly, if at all, register the pressure difference. Typically, this volume of gas is less than 0.25 cm$^3$. In one approach, the flange will have an additional small channel (connected to the analyzer or other vacuum system) over which the sample region would pass prior to reaching the channel in the flange device where the ion transfer occurs. This smaller channel has an inner diameter much smaller than that of the ion transfer channel and slowly evacuates the sample region prior to it being received over the ion transfer channel. The purpose of this step is to initiate ionization in vMAI so as to reduce the time for observing ions when the sample resides over the ion transfer channel in the flange device. It is understood that while prior evacuation of a spacer plate channel can be achieved if desired, it is not a necessary step, but is sometimes necessary for larger channels used with tissue imaging.

A means of applying an extraction, or repulsive, voltage to transmit the ions from the sample surface through the channel in the flange and into an ion guide or focusing lens to guide and/or focus ions into the mass analyzer optics may be provided, as well as a means of transmitting ions produced from the sample to the mass analyzer by means of a controlled gas flow. The ion guide/focusing lens may simply transmit the ions or transmit and focus the ions. The controlled gas flow aids in transmitting ions and neutral and charged clusters toward the mass analyzer. Coatings that enable one or more of several processes: conductivity (e.g., gold coating on glass plates), concentrating effects and sensitivity and homogeneity improvements (the principle of an anchor chip target plate), desalting ("Ziptip principle"), enrichment ("IMAC principle" for phosphorylation enrichment), charging (dielectric constant and other stationary enhancers), pre-separation (as in TLC plates and gels). While this may make the analyses more expensive, it may provide in certain cases the necessary improvements for precious samples and those with very limited volume (concentrations). The ions from the sample include bare analyte ions without matrix attached or analyte ions with matrix attached, e.g. charged particles, and may be singly or multiply charged. The optional integrated ion optic system ensures efficient transfer and focus of ions, charged particles into the mass analyzer. In vMAI it is speculated that neutral clusters might also be swept towards the mass analyzer and produce charged particles in a manner similar to the ions produced from the matrix on the substrate. The ion optics may include a simple electric field gradient, applied between the probe and the mass analyzer entrance, which accelerates and efficiently transfers the charge particles and ions, or more complex ion optics as discussed previously.

Applications of the multi-mode ionization apparatus and methods include, but are not limited to, biological MS, clinical and biomedical diagnostic analyses of various specimens including whole blood, serum, urine, hair, feces, mucus, saliva, tears, skin, mole, myeloma, tissue and tissue sections, pathogens, bacterial and virology diagnostic analyses (testing and monitoring), forensic and environmental analyses, airport and homeland security applications using portable and field deployable mass spectrometers as well as support of military chemical surveillance, synthetic applications such as those associated with materials developments applications (air and/or moisture sensitive compounds in conjunction with glove box device operation), pharmaceutical developments, high-throughput applications in a variety of different fields including inorganic, organic, biological, biochemical, biomedical, clinical, environmental, foods, pharmaceutical, homeland security, energy, military, and outer space applications. Specific types of sample classes include but are not limited to drugs, metabolites, lipids, peptides, proteins, carbohydrates, glycans, RNA, DNA, additives, oligomers, natural and synthetic polymers, polycyclic aromatic hydrocarbons, dendrimers, contrast agents, monolayers, artificial membranes, protein complexes, natural resources such as crude oil, as well as lanthanide and actinide chemistries. The vacuum ionization component of this expansive multi-mode ionization source may operate unmanned supported through computer assisted operation and software control. Robotics and streamlined workflow allow exposure-free mass measurements and analyses nearly instantaneously. Sample plates can be stored (bar code) or immediately disposed of safely following biohazard and chemical hazard regulations related to the samples that range from edible goods to highly toxic and even radioactive substances, in certain cases.

The field of robotics is undergoing revolutionary changes which will democratize robot use in all areas driven by lower costs and increased capabilities. Robotics in combination with the present invention supports unattended, untrained or minimally trained personnel, and unmanned operation. The apparatus and methods of this invention are expected to assist develop small scale and low cost robotics to speed analyses and lower costs in analytical chemistry while allowing dangerous materials to be safely characterized. The simplicity and robustness of the multi-mode ionization apparatus and methods in combination with robotics enables a new age "assembly line" to protect humans and ensure safety even during a pandemic. Principal component analysis (PCA) and other software application developments allow the rapid sorting of results between sample type, origin, quality (e.g., grade of meat products; disease versus healthy; disease type; and disease stage) based on the mass spectral fingerprints known to practitioners of the art. Similarly, software developed for differentiating, e.g., bacteria based on the Food and Drug Administration (FDA) approved Biotyper (Bruker) are applicable with enhancement in accuracy because more ions of small and large molecules are constituting a 'fingerprint' and because of the accurate mass and (ultra) high resolution when Fourier Transform (FT) (e.g., Orbitrap, ion cyclotron resonance [ICR's]) and charge detectors (charge detector mass spectrometry [CDMS]) are interfaced with the source of the present invention. Centers for Disease Control and Prevention (CDC), Department of Energy (DOE), Department of Defense (DOD), Department of Forensic Science (DFS), and Environmental Protection Agency (EPA), as examples, are expected to be impacted by the present invention.

Imaging, with and without the use of a laser, is accomplished using the typical imaging software developed previously for MALDI, and also used with newer ionization methods of desorption-ESI (DESI and LSI), as examples. The use of adjustable laser power, choice of wavelength, beam shape, and laser alignment allows imaging targeted tissue features, including single cells as one possibility. The spatial resolution is defined by traditional MALDI, LSI, LDI, arguments known to practitioners. Without use of a laser, vMAI can also be used with imaging and the spatial resolution being that of the sample spot (area exposed to the matrix and alternatively the area exposed to sub-AP).

Some of the analytes analyzed in full mass range mode are fatty acids, lipids, proteins, peptides, amino acids, sugars, carbohydrates, drugs, synthetic polymers, films, bacteria and fungi with and without extraction protocols using e.g. smears, swabs, tissue including butcher meats (various organs), mouse brain tissue, fish, fruits, vegetables, air and pH sensitive compounds, oligonucleotides, inorganic salts such as lanthanides and actinides, and complexes, perfluorinated compounds, compounds including intact and enzymatically digested proteins in in purified form as well as in detergents, high salt content conditions, and buffers, and RNA fragments in positive or negative ion detection mode. The ionization is typically through protonation $[M+nH]^{n+}$ and deprotonation $[M-nH]^{n-}$ with $n \geq 1$ using vMAI, however, metal cations such as mono- and divalent cations can be readily used to improve the ionization and in some cases the IMS separation and MS/MS fragmentation of polymers, sugars, carbohydrates, and other less basic compounds, especially using vMALDI. In certain cases, vLDI (no matrix addition) is sufficient for analyte ionization using a laser. Small molecules such as drugs directly from urine are readily observed with vMALDI, while proteins are readily analyzed with vMAI providing a mass range extension on mass range limited mass spectrometers because of multiply charging. vMALDI and vMAI have different selectivity for different compounds and compound classes, thus extending the range of compounds which can be analyzed with high sensitivity using the apparatus of this invention, contrary to a single ion source apparatus. This eliminates the need to change ion sources or even instruments to achieve a more complete analyses, which translates to cost and time savings. This is especially true for chemical analyses necessary to understand materials safety, or safely assist in ionizing and analyzing harmful materials that constitute a danger to humans, animals, plants and the environment such as toxicity, radioactivity, bacteria, and fungi, as well as tissue, whole blood and saliva, among others. The multi-mode ionization apparatus of the present invention adds a new dimension to MS, IMS, CDMS, and other instruments associated with gaseous ions for rapid and more complete analyses. The switch between the conventional ionization source of API of commercially available mass spectrometers from a variety of vendors including but not limited to Thermo, Waters, Agilent, Bruker, Sciex, Shimadzu, Advion, and JOEL is that of venting the instrument with switchover taking less than 1 hour and typically about 30 minutes plus the respective mass spectrometer pump downtime.

BRIEF DESCRIPTION OF DRAWINGS

The foregoing aspects of the invention will be more clearly understood from the following descriptions read in conjunction with the accompanying drawings in which:

FIG. 9 shows in FIG. 9A the total ion current chronogram of the protein ubiquitin using vMAI with the improved ion source while FIG. 9B is a mass spectrum obtained from a single acquisition showing charge states of the protonated molecular ions.

FIG. 10B shows the mass spectra obtained from 3 of the samples on an Orbitrap mass spectrometer.

DETAILED DESCRIPTION OF DRAWINGS

Figure 1:
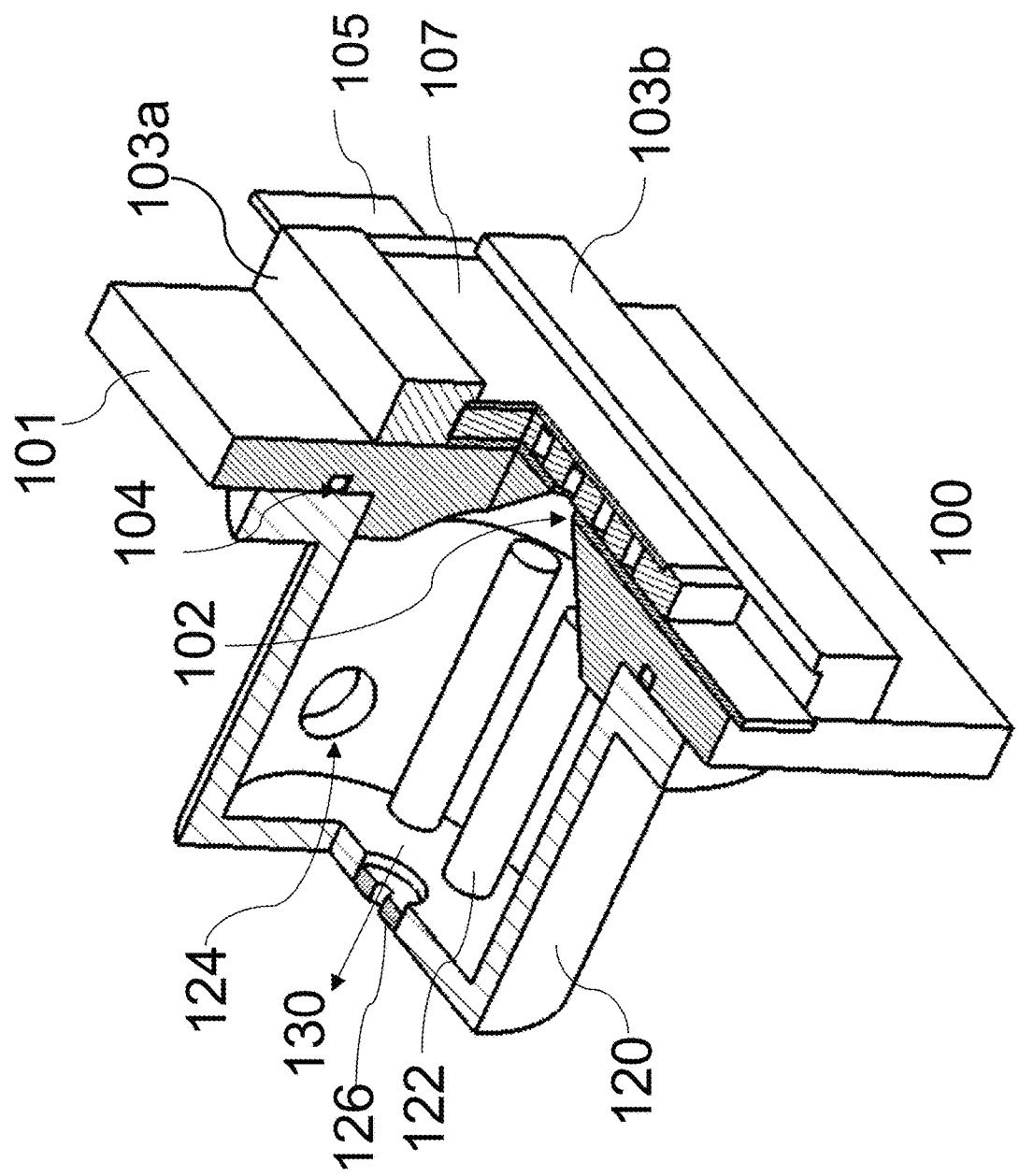
FIG. 1 is a 3-dimensional cutaway representation of a preferred embodiment of an improved vacuum ionization source for mass or ion mobility analyzers and includes a flange device, sample guide rails, ion guides, inlet chamber, and sample plate device.

FIG. 1 is a schematic of a cutout 3-dimensional view of a preferred embodiment of an apparatus 100 which allows rapid or slow sequential individual exposure of samples individually to the vacuum of a mass spectrometer while all other samples remain at or near atmospheric pressure (AP). Gas-phase ions generated by vacuum matrix-assisted ionization (vMAI) are transmitted into the analyzer 130 through restriction 126. The schematic is a generalized representation of a modification of a commercial AP ionization (API) inlet vacuum chamber 120 of a mass spectrometer. The vacuum chamber 120 may have a rotary pump 124 connected thereto which is required for normal operation where an inlet aperture, typically between 400-800 microns inner diameter leaks air and/or nitrogen or other gases into chamber 120 from an API region as in electrospray ionization (ESI), AP chemical ionization (APCI), or AP matrix-assisted laser desorption/ionization (MALDI). These sources and methods are used in mass spectrometry (MS) and ion mobility spectrometry (IMS) for analyses, as well as for surface imaging MS, for large (e.g., proteins) and small molecules (e.g., lipids, drugs) within e.g., biological tissue.

In FIG. 1, the commercial inlet tube or aperture device with flange used with API sources has been replaced by flange device 101 which forms a vacuum seal with chamber 120, in this case, using "O-ring" 104. Other means of forming an air tight seal such as gaskets can be used. Flange 101 has a conduit or channel 102 with diameter between approximately 2 mm and 10 mm, typically on axis with the first ion transfer optics. The channel 102 in flange device 101 allows fluid communication between a higher pressure region, typically AP, and the lower pressure region within chamber 120. Unless the channel 102 is covered to make a near air tight seal, the airflow would overload the pumping system of the analyzer. Vacuum chamber 120 may contain ion extraction lens, an ion guide and/or focusing elements 122, which may be a single device, and in certain configurations desolvation devices such as obstructions or heater elements. Ions produced from a sample travel through opening 102 into the ion guide/focusing elements and through a restriction 126 into the mass analyzer 130. Restriction 126 is designed to provide a pressure drop between inlet chamber 120 and the mass analyzer 130 of the mass spectrometer. This pressure drop is necessary for API instruments. Flange 101 has situated on the face opposite chamber 120, and typically at AP, two guide rails 103a and 103b to allow a sample plate device 107 to slide over the channel 102 in flange device 101. The channel in flange device 101 aligns with the ion guide arranged in a manner that allows gas-phase ions and charged particles produced from a sample to traverse into the analyzer 130, which may be a mass or ion mobility analyzer. Other configurations can be envisioned, but of importance here is the ability to sequentially expose samples to the vacuum of a mass spectrometer or ion mobility spectrometer by sliding a sample plate device 107 containing one or more samples across channel 102 with minimal increase in the pressure in the analyzer. An optional valve plate 105 resides between the flange device 101 surface and the sample plate device 107 which slides to one of two positions. In the open position, a channel in the valve plate 105 of equal diameter to the inner diameter of channel 102 is aligned with channel 102 so that the lower pressure in chamber 120 is in fluid communication with the sample in the sample plate device 107.

Figure 2:
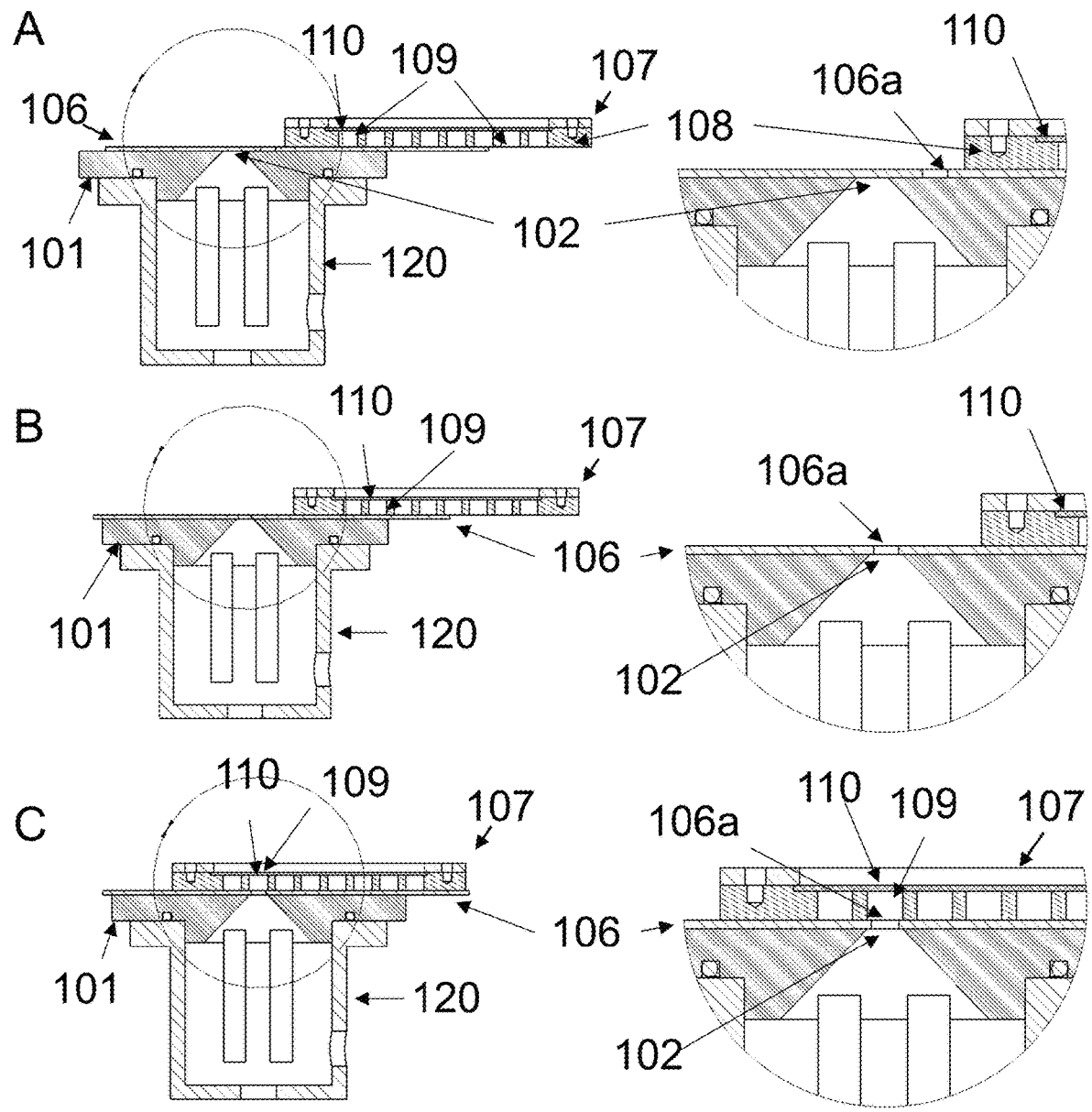
FIG. 2 is a schematic side view representation of one embodiment of an improved ion source apparatus for sample introduction to the vacuum of a mass or ion mobility analyzer showing different arrangements of a sample plate device interfaced to a flange device in FIG. 4 A-C and associated expanded insets.
Figure 4:
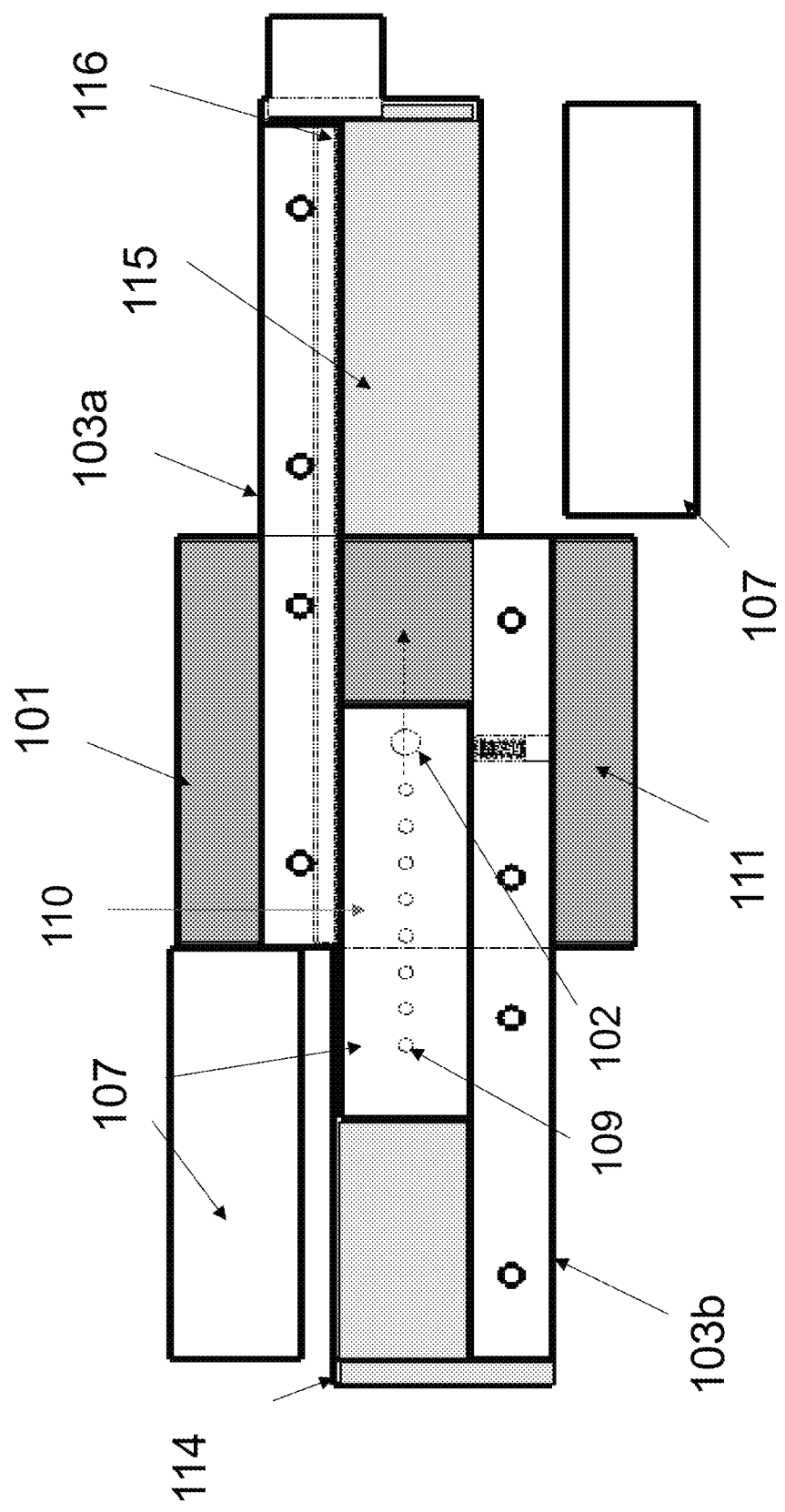
FIG. 4 is a schematic top view representation of a preferred embodiment of an improved apparatus for use with an ion source of a mass spectrometer including a motorized drive for moving sample plate devices along a grove defined by guide rails.

FIG. 2 further clarifies the operations of the invention through a series of schematic representations with associated insets for additional detail. A side view of a simplified flange device 101 with a valve plate 106 and a sample plate device 107 made up of a spacer plate 108 with multiple channels 109 therethrough and a sample plate 110 is presented in FIG. 4 A-C. FIG. 4A is a depiction of flange device 101 with channel 102 covered by a valve plate 106, which in this case is a solid flat rectangular metal or plastic piece with a hole 106a therethrough. The thickness of the valve plate 106 is typically less than 5 mm and preferably between 1 and 3 mm, but can have other dimensions of thickness. The width is sufficient to cover hole 106a and substantially seal channel 102. The valve plate 106 may be held in place by a cutout in the guide rails 103 making a slot between the guide rail and the AP face of the flange device 101. In the position shown in FIG. 2A and inset expansion to the right, the valve plate seals channel 102 in flange device 101 thus separating the higher pressure region which is typically at or near AP from the lower pressure region defined by chamber 120. However, sliding the valve plate left in FIG. 2A opens channel 102 through hole 106a to the higher pressure region. The outcome depicted in FIG. 2B expansion is undesired as channel 102 and hole 106a are typically greater than 2 mm in diameter and sufficiently large to increase the pressure in the analyzer above the operational pressure. Thus, in the situation where no sample plate covers valve plate 106, the closed position shown in FIG. 2A would be used. Safeguards may be used to prevent the situation depicted on FIG. 2B from occurring. FIG. 2C shows an example where a spacer plate 108 with channels 109 therethrough lies over the valve plate 106 in the open position in which hole 106a lies over channel 102 in the flange device 101. So long as there are flat surfaces in intimate contact with one another, the vacuum of the mass spectrometer is maintained provided the sample plate 110 is placed over spacer plate 108. In this case only the gas, typically air, in channel 109 over channel 102 is drawn into the region enclosed by chamber 120. Because the analytical samples residing on the sample plate align with channels 109 of the spacer plate, the samples never contact the valve plate 106 surface, or in the absence of a valve plate, the flange device 101 surface. In an alternative arrangement, the sample plate device 107 can be replaced with a sample plate device 107 in which the spacer plate 108 and flat sample plate 110 is replaced with a sample plate having indentations or wells for samples to reside. While wells work well with vMAI, they are restrictive with vacuum MALDI (vMALDI) in that only reflective geometry laser ablation is possible unless special plates with indentations made from glass or quartz are used to allow laser beam transmission to reach the sample. By including a spacer plate with channels therethrough between the sample plate and the flange device, wells are created by the spacer plate channels.

Figure 3:
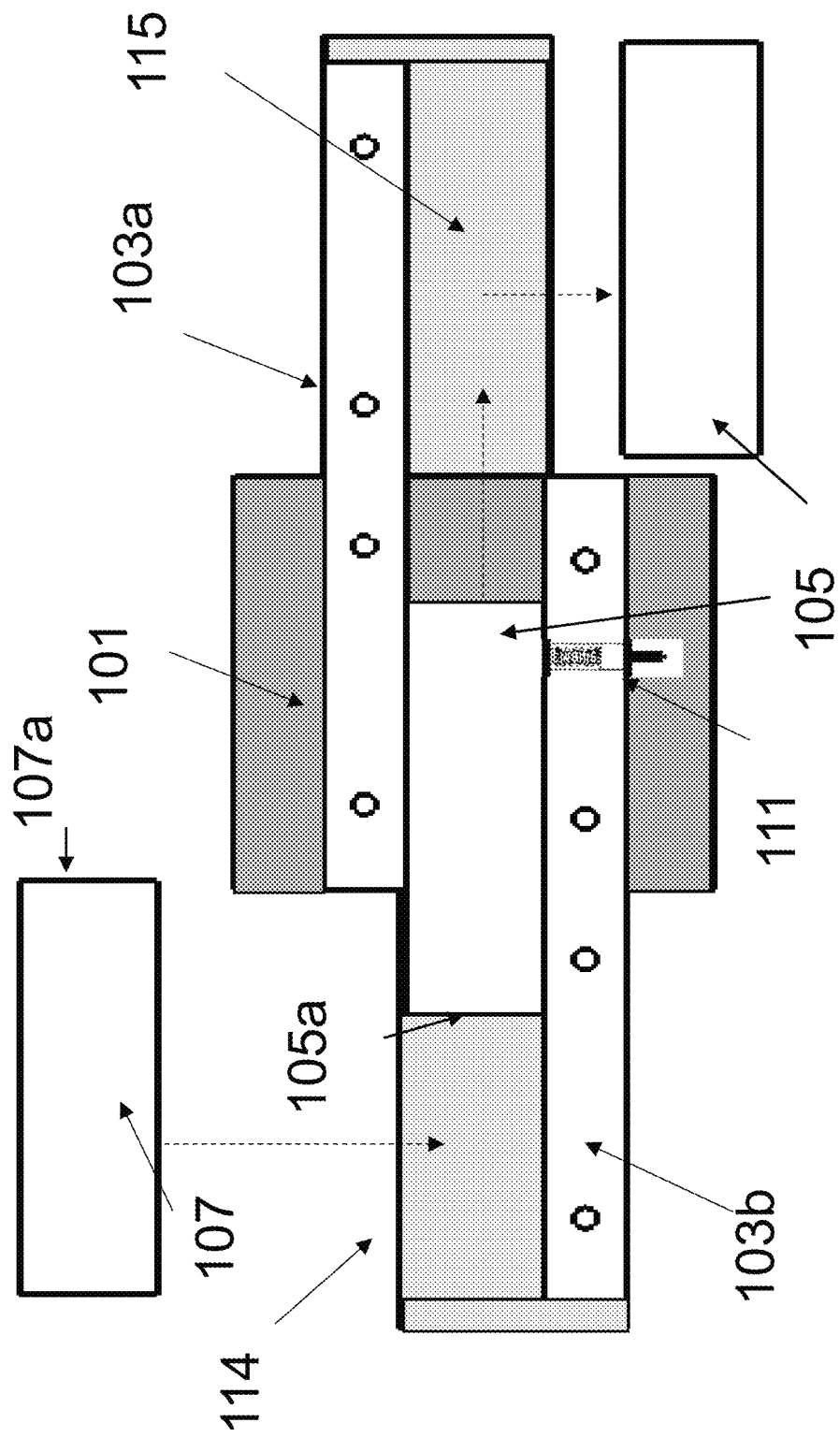
FIG. 3 Is a schematic top view representation of a preferred embodiment of an improved apparatus for use as an ion source of a mass spectrometer or ion mobility spectrometer including sample plate devices, flange device, plate device guides, and a device to apply voltage to the sample plate device.

FIG. 3 is a simplified schematic of a top view of a preferred representation of the multi-ionization apparatus with additional components. This schematic is simplified for clarity. Flange device 101 has attached to the surface guide rails 103. In this depiction, a blank plate device 105 with a flat surface slides across the flat surface of flange device 101 and fits between the guide rails 103a and 103b. The purpose of the blank plate device 105 is to act as a valve to close channel 102 in flange device 101 to prevent gas flow from the higher to the lower pressure region. In this arrangement all plate devices slide across the face of the flange device and over time may produce wear on the face of the flange device.

The valve plate 106 depicted in FIG. 2 lies between the flange device 101 and the sample plate device 107 and is readily replaced if necessary. Sample plate devices 107 can be abutted with one another or a blank valve plate 105. The flat surfaces of the blank valve plate 105 or sample plate devices 107 are able to slide along the channel defined by the guide rails 103a and 103b while sealing the channel 102 in flange device 101 to maintain operational vacuum in chamber 120. Likewise, a sample plate device 107 can replace valve plate 105 by sliding along the guide rails to present a flat edge surface 107a against the flat edge surface 105a of the blank valve plate 105. The edge surfaces 107a of sample plate device 107 and 105a of blank valve plate 105 are flat so as to make a near air-tight seal when the plates are pushed together in intimate contact. In this manner, sample plate device 107 can be pushed against the blank valve plate 105 to slide the blank valve plate across channel 102 with minimal disturbance of the vacuum. Note that when a sample plate device covers channel 102 the pressure differential across the plate holds the plate against the flat surface of flange 101 maintaining chamber 120 well within the designed pressure range and less than 10 mbar and preferably less than 1 mbar pressure, although it can be designed to allow higher pressure in the region defined by chamber 120. However, the guide rails 103 or other devices may be used to apply pressure to the blank valve plate 105 or plates device 107 to assure that a plate covering channel 102 cannot be dislodged and cause loss of instrument vacuum. Also, the viewed surfaces in FIG. 2 are at or near atmospheric pressure. Therefore, a sample plate device 107 holding sample(s) at AP can be used to replace a sample plate device 107 by the same mechanism described for replacing the valve plate 105. Plate replacement occurs at AP with the only area exposed to sub-AP is the area of the sample plate device 107 or valve plate 105 that lies directly over the channel 102 in flange device 101. Note that a flat surface may be curved so long as the two surface fit together to maintain a substantial vacuum seal and in some cases slide over one another. An insulated electrically conductive feedthrough 111 allows application of voltage or ground potential to the sample plate device 107 in order to produce a voltage gradient between the sample plate device 107 and, lens elements on the low pressure side of channel 102. A variety of lens elements 122 may be used to focus and or transfer ions into the ion optics of the analyzer including but not limited to a tube lens, Einzel lens, ion funnel, and quadrupole, hexapole, or octupole ion guides.

FIG. 4 depicts a partial top view schematic representation of a preferred embodiment showing automated plate movement in apparatus 100 using a motorized screw drive 116, but other methods, as for example a belt drive may be used. Other devices familiar to those practiced in the art can also be used. In the automated mode, sample plate device feeder 114 (not shown for clarity) is the interface between a cassette (not shown in this representation) holding multiple plate devices 107 and a groove defined by guide rails 103 and the face of flange device 101. In one embodiment, the plate device feeder 114 allows a plate device 107 to move into position in the plate device receiver grove and resting on guide rail 103b. In this position, the sample plate device 107 can be moved in the groove toward channel 102 and between guide rails 103a and 143b. An automation device 116 having a computer controlled motor drive moves the sample plate device 107 to expose each sample aligned in a linear row on the sample plate sequentially over channel 102. Note that channel 102 is at all times closed from AP or near AP by either the blank valve plate 105 or by the plate 107. When closed by the sample plate device 107, channel 102 is not closed by a valve plate 105. Note that in this representation, the position of channel 102 is shown for clarity and channels 109 in spacer plate 108 are visible through the sample plate 110 which is represented as a glass microscopy slide.

Figure 5:
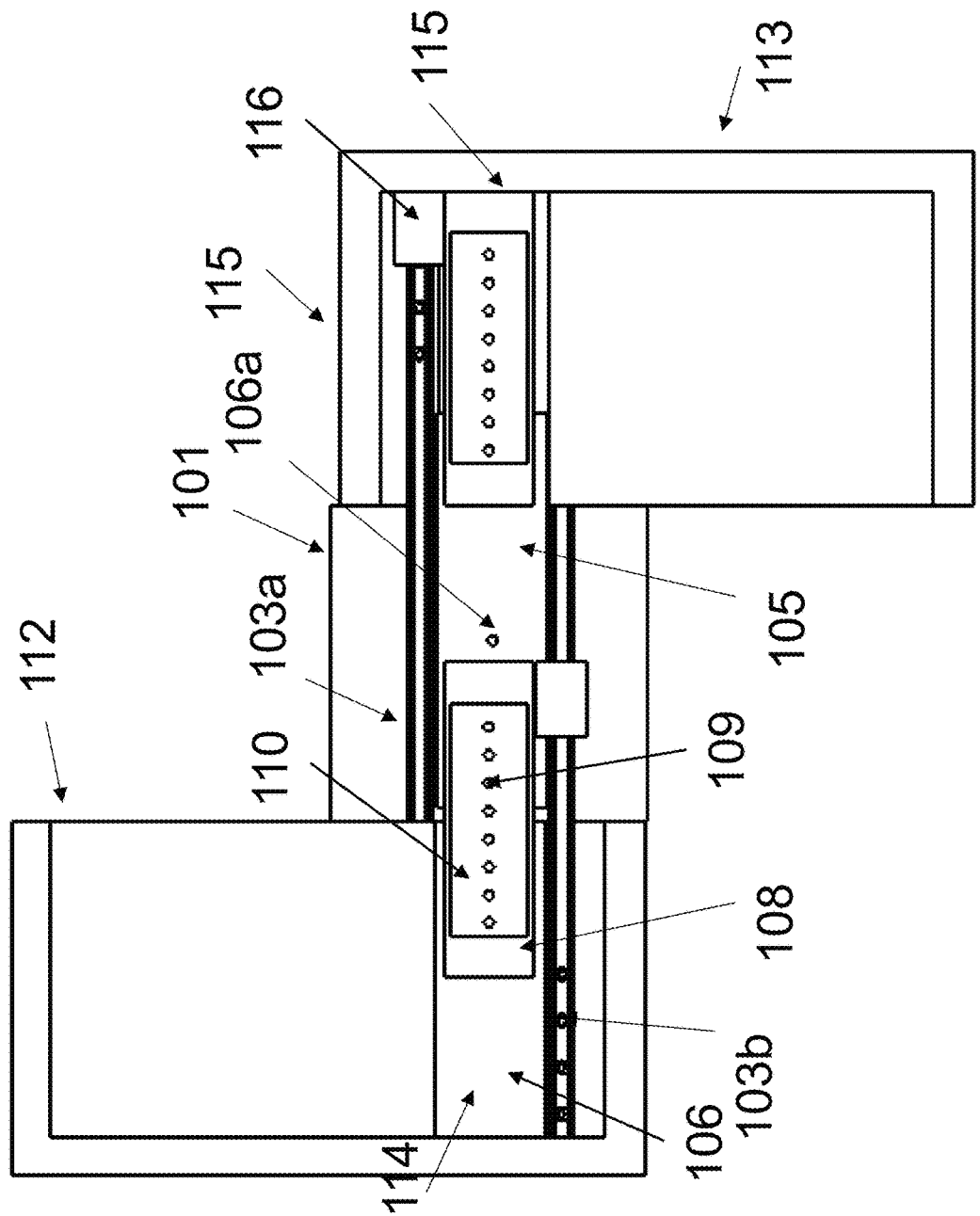
FIG. 5 is a schematic top view representation of a preferred embodiment of an improved apparatus for automated sample introduction to the vacuum of a mass spectrometer or ion mobility spectrometer for sample ionization displaying sample plate devices, motorized drive, and sample plate device feeder and receiver cassettes.

FIG. 5 is a simplified schematic of a top view of a preferred representation of an ion source apparatus for automated high throughput sample analyses. The apparatus of FIG. 5 allows rapid sequential exposure of samples residing on a sample plate 110 at or near AP to the first vacuum stage 120 of analyzer 130 when the sample is moved over channel 102 by sliding the sample plate device 107, which incorporates sample plate 110, between guide rails 103. In this view, a representation of a plate device feeder 114, feeder cartridge 112, plate device receiver 115 and receiver cartridge 113 are combined with flange device 101, guide rails 103, sample plate device 107, and sample plate drive 116. Plate device 107 contains a spacer plate 108 sitting atop a valve plate 106. Channel 102 is open when the hole 106a in valve plate 106 aligns with channel 102 and closed when the valve plate 106 slides between guide rails 103 so that channel 102 and hole 106a are not aligned. Under certain circumstances the valve plate 106 can be eliminated. In this arrangement, the channel 102 in flange device 101 can be covered or open by simply sliding the plate device 107 over channel 102. Alternatively, a blank valve plate 105 can be used to cover channel 102 when data acquisition is not being carried out.

In the representation in FIG. 5, the sample plate device 107 consists of a glass slide sample plate 110 affixed on top of the spacer plate 108 which has channels 109. For representation purposes only, the view shows the positions of two sample plate devices 107 separated to show hole 106a in valve plate 106. So long as hole 106a is not over channel 102 in flange device 101, the pressure in the analyzer will not be affected. In operation, hole 106a aligns with channel 102 and the two sample plate devices 107 abut each other and cover the hole 106a in the valve plate 106 to substantially seal channel 102 from gas flow from the higher to the lower pressure regions.

The operation of the device represented in FIG. 5 can be visualized as follows. A sample plate device 107 containing samples which are typically made of a matrix and an analyte and residing on a sample plate 110 in positions that align with channels 109 in spacer plate 108, the sample plate 110 being in intimate contact with spacer plate 108 to form a substantial vacuum seal, is place in the feeder assembly cartridge 112, typically with other sample plate devices 107 containing sample to be analyzed. The bottom plate device drops into feeder assembly 114 when a sample plate device 107 sliding over valve plate 106 and between guide rails 103 clears feeder assembly 114. The dropped sample plate device 107 rests on guide rail 143b and is moved towards sample plate device receiver 115 by the computer controlled motorized automation device 116 and makes intimate contact edge to edge with the next plate device in the grove between the guide rails 103. A sufficient vacuum seal is created over hole 106a when the pressed together edges 107a of sample plate devices 107 pass over hole 106a. When the sample plate device 107 reaches the plate receiver 115, it drops into the receiver cartridge 113, thus freeing the next sample plate 107 to continue moving into the feeder receiver 115. By mechanically moving only the last plate to exit the feeder cartridge 112 onto the guide rail 103b, the resistance to movement caused by friction between the plate device 107 and the valve plate 106, or in the case where the valve is a blank valve plate 106a, the flange device 101 surface, results in a tight fit of the sample plate device 107 sides 107a so that the interface of the two plates passing over hole 106a in the valve plate 106 or the channel 102 in the flange device 101, respectively, will not significantly disrupt the vacuum of the analyzer 130.

The device represented in FIG. 5 can further be used to automatically acquire mass spectra of samples aligned on sample plate 110 in a linear fashion and in positions aligned with channels 109 in spacer plate 108. In this mode, when the sample plate device 107 clears the feeder 114, the next plate in feeder 114 drops into position onto guide rail 143b and the automated drive 116 begins moving the new sample plate toward channel 102. Meanwhile, sample plate receiver 115 collects sample plate devices 107 which drop into receiver 115 once clear of the guide rail 103b. Other configurations can be employed to achieve automated sequential exposure of samples to the vacuum of a mass spectrometer.

Figure 6:
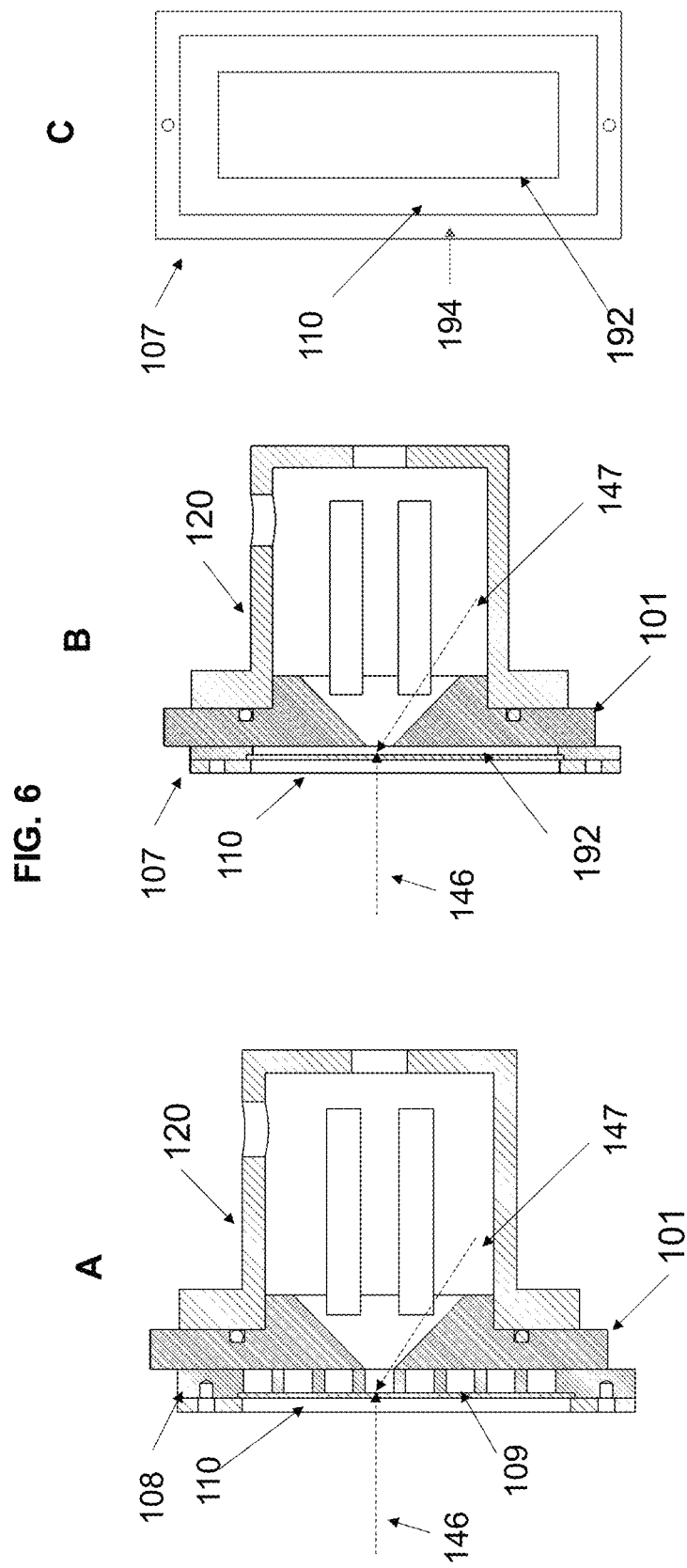
FIG. 6 is a schematic side view representation of a preferred embodiment of an improved ion source depicting laser ablation in transmission or reflective geometry in FIG. 6A and in FIG. 6B and FIG. 6C a means to use the apparatus for surface imaging.

FIG. 6 is a representative schematics of preferred embodiments providing additional details relative to use of the invention for sample analyses using vacuum MALDI (vMALDI) and for imaging by laser ablation MALDI. Reflective geometry typically requires the laser beam 147 travel through a portion of vacuum chamber 120 and channel 102 in flange device 101 before striking the sample. Such an arrangement requires a transmission window into chamber 120 and mirrors in addition to optical focusing lens (not shown in FIG. 6A or FIG. 6B) to guide the focused laser beam to the sample, or alternatively, to use of fiber optics. For many applications of MALDI, transmission geometry laser ablation is preferred where the laser beam 146 strikes the sample from the AP side (backside). In this case, as depicted in FIG. 6A, a spacer plate 108 with channels 109 therethrough lies in intimate contact with the surface of flange device 101, assuming a valve plate 106 is not situated between the spacer plate 108 of plate device 107 and the surface of flange device 101 facing the AP region. The sample plate device 107 consisting of a spacer plate 108 and a sample plate 110 can slide over the flange device 101 surface or alternatively the valve plate 106 guided by the guide rails 103. In the case of using a valve plate 106, the valve plate remains stationary in the open position. So long as a sample plate device 107 is over channel 102, the spacer plate 108 channel 109 is substantially sealed from AP and in fluid communication with the lower pressure region inside chamber 120. When using a flat sample plate 110 for samples, indentations are not required as the samples can fit within the channels 109 of spacer plate 108. The matrix: analyte samples, typically made up of matrix and analyte reside on the surface of the sample plate 110 in the position where they fit within the channels 109 on spacer plate 108. However, indentations may be used, and in certain configurations it may include a commercial well plate. The indentations, may aid sample alignment with the channels 109 in the spacer plate 108. The sample plate 109 is held stationary relative to the spacer plate so that sliding the spacer plate along the guide rails also moves the sample plate.

While a variety of sample plate materials can be used for vMAI including, but not limited to, metal and polymer, only a plate which allows transmission of the laser beam can be used with transmission geometry vMALDI or vLSI. One possibility is use of a glass microscopy slide which does not require a conductive surface, so long as the spacer plate is conductive. However, for the positive (negative) ion mode, a microscopy slide with a coating having a positive (negative) charge is beneficial, especially for vMAI, through special coatings. With a sufficiently thin spacer plate, voltage or ground potential may be applied to valve plate 106 as long as it is made of conductive material such as metal. In one preferred embodiment for valve plate 106, Teflon is used to provide a good vacuum seal and easier movement of plate device 107. In summary, voltage or ground potential on one of valve, spacer, or sample plates is desirable for best results, especially at low gas flow (low pressure). Voltage or ground potential can be applied to the plates through electrically conductive device 111 as depicted in FIG. 3. Otherwise, a gas flow to guide ions from the sample into the ion guide/focusing region and inlet to the mass spectrometer is necessary to transmit ions and charged particles produced in the ionization process. Even with three interfaces of flat surfaces, the vacuum of the mass spectrometer is held stable with the arrangement shown. For glass or quartz sample plates, transmission geometry laser ablation can be used to obtain vacuum MALDI mass spectra. The laser beam may strike the sample through sample plate 110 from the backside at angles ranging from 25 to 90 degrees, and preferable 45-90 degrees, or alternatively fiber optics can be used.

FIG. 6B depicts a schematic representation of a preferred embodiment of a simplified method for surface imaging using the inventions described herein. The laser beam can illuminate the sample from transmission 146 or reflective 147 geometries. The differences between this depiction and that in FIG. 6A is that the spacer plate has one large channel 192 instead of multiple smaller channels 109. This is depicted by a top view of sample plate device 107 in FIG. 6C. A glass or quartz sample plate 111 may fit on top of spacer plate 108 with channel 192 so that the sample plate 110 is held in place by frame 194. The arrangement is especially useful for imaging where, e.g. a biological tissue slice is affixed to the transparent sample plate 110 and matrix solution is applied in a manner common to MALDI imaging and dried before the sample plate device 107 is placed over channel 102 in flange device 101. For imaging larger sections, movement of the sample s plate device 107 is achieved by sliding in 2 dimensions while firing the laser using optical lens elements to focus the beam on the tissue being imaged as known to those practiced in the art.

Figure 7:
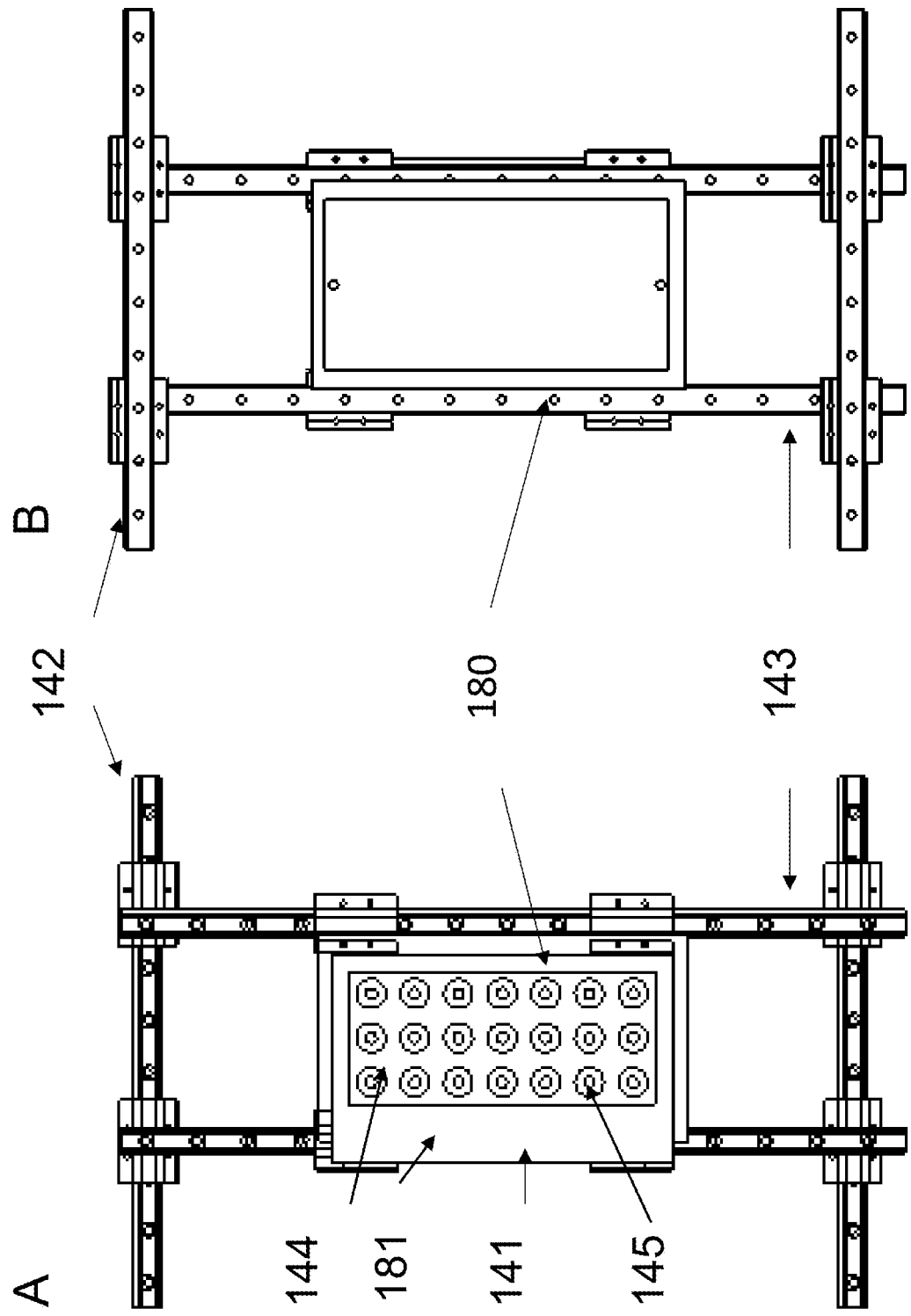
FIG. 7 is a schematic view of representations of a preferred embodiment of a means of sequentially exposing multiple samples from a 2-dimensional plate to the vacuum of the inlet chamber of a mass spectrometer or ion mobility spectrometer where ionization and ion transmission are initiated.

FIG. 7 is a depiction of a preferred embodiment of a means to move sample plates in 2 directions. Rails 142 and 143 are 90 degrees to one another. Valve plate 181 in this depiction is part of the 2 dimensional sample plate holder 180 so that positioning the valve plate portion 181 over channel 102 in flange device 101 allows removal of the 2-dimensional sample plate 144 having indentations 145 for samples. FIG. 7A is from the side facing the instrument vacuum and FIG. 7B is from the side at AP. The rails can be driven by computer controlled stepper motors familiar to those practiced in the art. The same arrangement can be used when imaging. Other arrangements to sequentially expose samples on a 2 dimensional plate can be envisioned.

Figure 8:
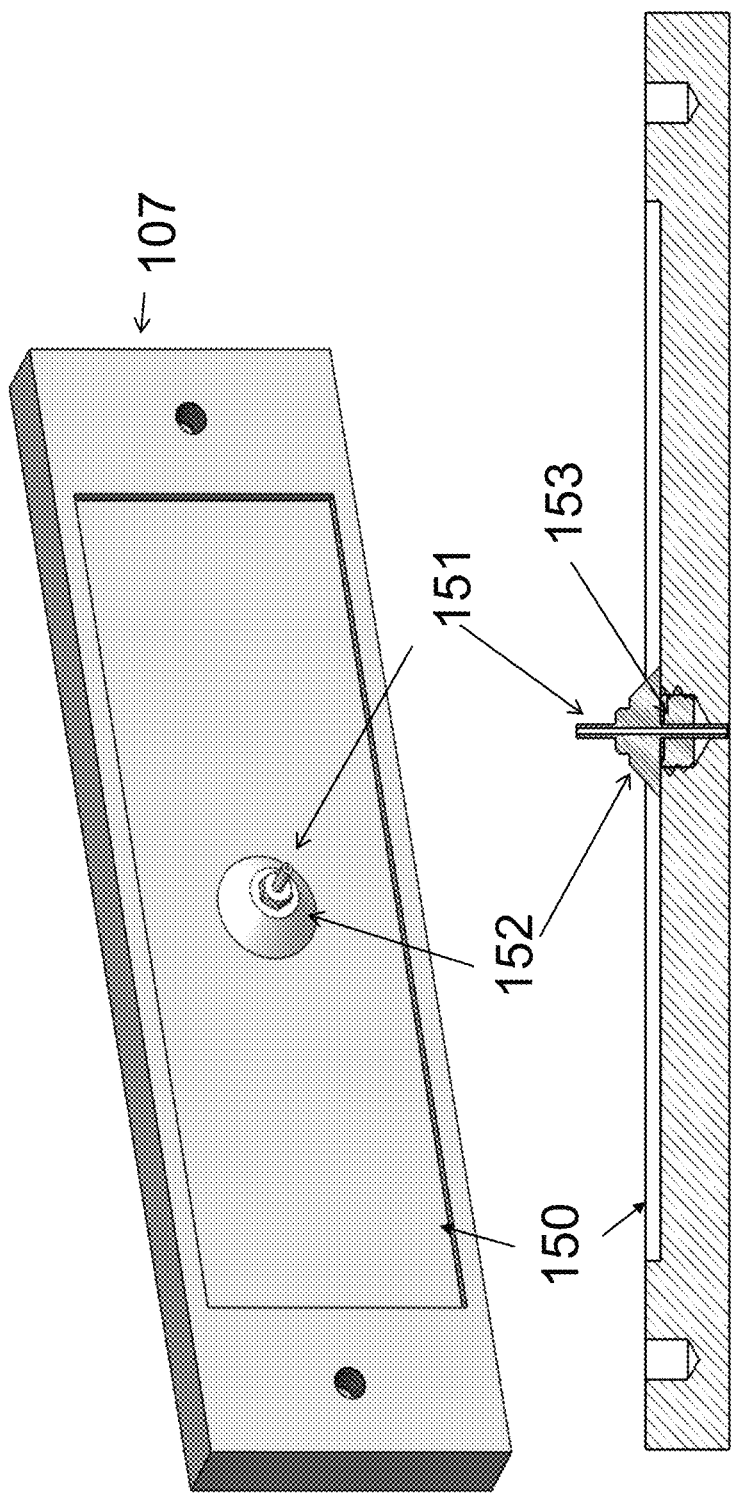
FIG. 8 is a schematic of a preferred embodiment of a sample plate holding an inlet tube to allow atmospheric pressure ionization (API) methods on the vacuum multi-mode source.

FIG. 8 is a schematic representation of a preferred embodiment of a means of using the present invention to obtain electrospray ionization inlet, solvent-assisted ionization or matrix-assisted ionization (MAI) using an inlet tube without the necessity to vent the instrument to install an AP ion source. This invention is especially valuable for calibrating the instrument using ESI. A plate device 107 is composed only of a blank spacer plate with indentation 150 normally used to hold and align a sample plate. The plate device has a channel 109 therethrough into which an inlet tube 151 is held with a vacuum tight seal represented by a screw cap 152 which tightens onto a 'o'-ring 153. The inlet tube with inner diameter between 0.4 mm and 1 mm is designed to be open to at or near AP at the end facing toward the viewer in the top depiction and upward in the lower depiction. The other end of the inlet tube resides in plate device 107 and near the face of the plate device which slides along the flange device 101 or valve plate 106 surface. When the inlet tube is aligned with the opening 102 in flange device 101, the exit end of inlet capillary 151 is in fluid communication with the lower pressure region inside chamber 120. The end in of inlet tube 151 does not protrude through spacer plate 108 so as not to contact either the flange device 101 surface or the surface of valve plate 106 when sample plate device 107 slides within the grove defined by guide rails 103. The length of the inlet capillary on the AP side of the plate device 107 can be of length of a few millimeters to several meters. Interchange of the sample plate device 107 containing inlet tube 151 with any plate device 107 follows the same procedure as detailed above for interchanging plate devices.

The descriptions provided is of exemplary arrangements, and one skilled in the art will be able to envision other arrangements including other 2 dimensional arrangements of samples in which the sample plate can move in the x and y directions as used with MS imaging sources and methods. The inventions described herein apply to 1- and 2-dimensional arrangements of samples because both can advantageously use flat surfaces to substantially seal the vacuum of a mass spectrometer from AP or near AP while allowing the plates to slide across channel 102 in flange device 101. In certain configurations a 3-dimensional could be analyzed directly with quite some limitations; preferably inlet ionization or traditional API methods with an extended inlet are preferred. While some API mass spectrometers have pumping capacity to operate with channel 102 diameters up to 1 mm in diameter, typical size of channel 102 of this invention is typically between 2 mm and 7 mm in diameter in order to allow maximum ion transmission and the maximum number of samples on a sample plate without any two samples being simultaneously exposed to the lower pressure of the analyzer. The sample plate 110, when not using a spacer plate 108, has at least 1 indentation or well into which the sample, typically a matrix and a analyte, is placed so that the sample does not come in direct contact with the flange surface which can result in carryover between samples. However, more typically the sample plate 110 has multiple indentations for multiple samples. Alternatively, the sample plate may have a spacer plate 108 inserted between it and the surface of flange device 101 in which one or more channels pass through the spacer plate 108 so that the sample, on a sample plate 110 is in fluid communication with the vacuum of the mass spectrometer when the channel 102 in flange device 101 is aligned with the channel 109 in spacer plate 108 and the matrix:analyte sample. Additionally, a valve plate 106 may be placed between the sample plate 110, or the spacer plate 108, and the flange device 101 to allow closure of channel 102 in the flange device 101 when no sample plate device 107 covers channel 102.

Other arrangements of the valve plate may be envisioned, including a valve built into the flange. However, the valve plates described herein are inexpensive and do not significantly increase the distance between the sample and the ion extraction lens. Another aspect of the invention is that samples may be exposed to vacuum sequentially so that only one sample is exposed to the vacuum of the mass spectrometer for transmission of ions at a time. Therefore, the pumping requirement is greatly reduced relative to inserting a sample plate through a vacuum lock into the first vacuum chamber of the mass spectrometer. However, spacer plate channels may be made sufficiently large to encompass more than a single sample or to encompass a surface for imaging.

The samples are usually prepared at AP by pipetting or using sample preparation apparatus common to MALDI, e.g. dried droplet, layered, spray coating approaches, or solvent-free matrix coating. A matrix is broadly defined as a compound providing a condition which enhances the ionization of analyte molecules. However, in laser desorption, DIOS, and SELDI, no matrix compound is necessary for ionization upon laser ablation. Except for the sample over channel 102 in flange device 101 and in fluid communication with the vacuum of the mass spectrometer 130, the remaining samples on the sample plate 110 are at or near AP. Therefore, unless gas is leaked into the system purposely to speed the ionization process or to aid in transfer of ions to the mass analyzer, the only gas introduced by each sample into the vacuum of the mass analyzer 130 is that in each indentation on sample plate 110 or channel 109 of spacer plate 108. Note that the spacer plate 108 may be of varying thickness, as for example 1 mm or 13 mm, as well as varying channel diameters such as approximately 2 mm or approximately 7 mm, or even larger and under certain circumstances smaller. While gas may be leaked into the system to hasten ionization or to transfer ions from the sample to the mass analyzer, a voltage differential may advantageously be used for ion transfer. This voltage difference is typically placed between the sample plate 110 or the spacer plate 108 and the lens elements 122 which may contain an extraction lens, but other arrangements known to those practiced in the art may be used to transport ions through an electric field.

The ionization apparatus which employs a spacer plate 108 and a glass or quartz microscopy slide as sample plate 110 may also be used to substantially seal the channels in the spacer plate to secure the vacuum of the mass spectrometer when the sample plate device 107 is covering channel 102 in flange device 101. This arrangement is advantageous in that it allows ionization by transmission geometry vMALDI or vLSI, or use of vMAI. Each ionization method may be used on sequential samples simply by employing laser ablation using a MALDI suitable matrix or a vLSI suitable matrix, or not employing the laser with a vMAI suitable matrix. The time between ionization of samples with different ionization methods, once the sample is loaded onto the sample plate may be as little as 5 seconds. Likewise, reflection geometry vMALDI, LSI and vMAI can be obtained even for adjacent sample using the same procedure so long as the laser has been set up for reflection geometry. A laser can be of low or high performance in power and speed, although for imaging applications in transmission geometry, more powerful lasers are preferred for more effective penetration through the tissue. The laser wavelengths can be ultraviolet or infrared, as known to those practiced in the art. A microscopy slide with e.g., a positive surface coating may advantageously be used for positive ion analyses. Those practiced in the art will understand other surface coatings such as gold coatings and anchor chip targets and alike constructions can work as well. With the arrangement described herein, samples on glass TLC plates can be acquired and with specially designed spacer plates can be used to obtain mass spectra from ZIP tips so long as the ZIP tip forms a snug fit with the channels in the spacer plate.

Figure 9:
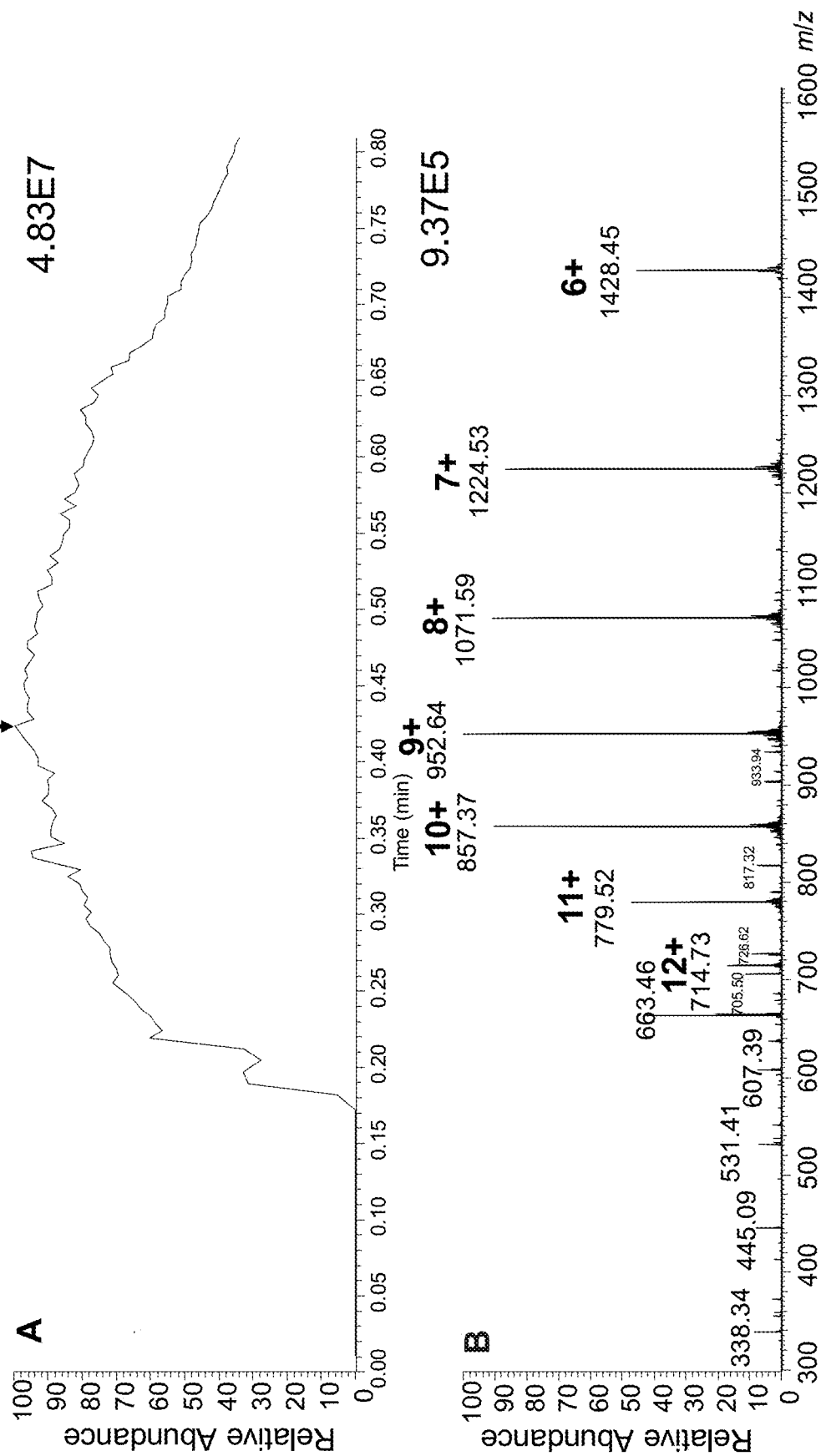

FIG. 9 shows a mass spectrum of 2.5 picomoles of the protein ubiquitin dissolved with a 2:1 binary mixture of a 3-nitrobenzonitrile (3-NBN) and alpha cyano-4-hydroxycinnamic acid (CHCA) matrix in a 2:1 acetonitrile:water solvent and applied to a glass slide and acquired using the invention described herein in the vMAI mode by simply exposing the sample to the vacuum of a Thermo Fisher Scientific Q-Exactive Focus mass spectrometer through channel 102 in flange device 101. A 5 mm thick spacer plate 108 with 4 mm diameter channels 109 were used and positive 200 V were applied to the metal spacer plate. The top graph labeled A shows the total ion current as a function of time. In this case the sample remains exposed to the vacuum of the mass spectrometer until the matrix completely sublimes. The mass spectrum acquired where the arrow is pointing is shown in the bottom graph labeled B. The peaks labeled 714.73, 779.52, 857.37, 952.64, and 1071.59 are part of a series of molecular ions of ubiquitin having 12, 11, 10, 9, and 8 protons attached, respectively, providing 12+, 11+, 10+, 9+, and 8+ charges (z). Multiplying the associated mass-to-charge number such as 857.37 times the associated number of protons (in this case 10) gives 8573.7 which provides the molecular weight (MW) of the labeled isotope peak after subtracting the mass of the 10 protons, or 8563.7 Da. The advantage of extended ionization time is that multiple experiments such as data dependent mass selected fragmentation acquisitions can be acquired.

Figure 10:
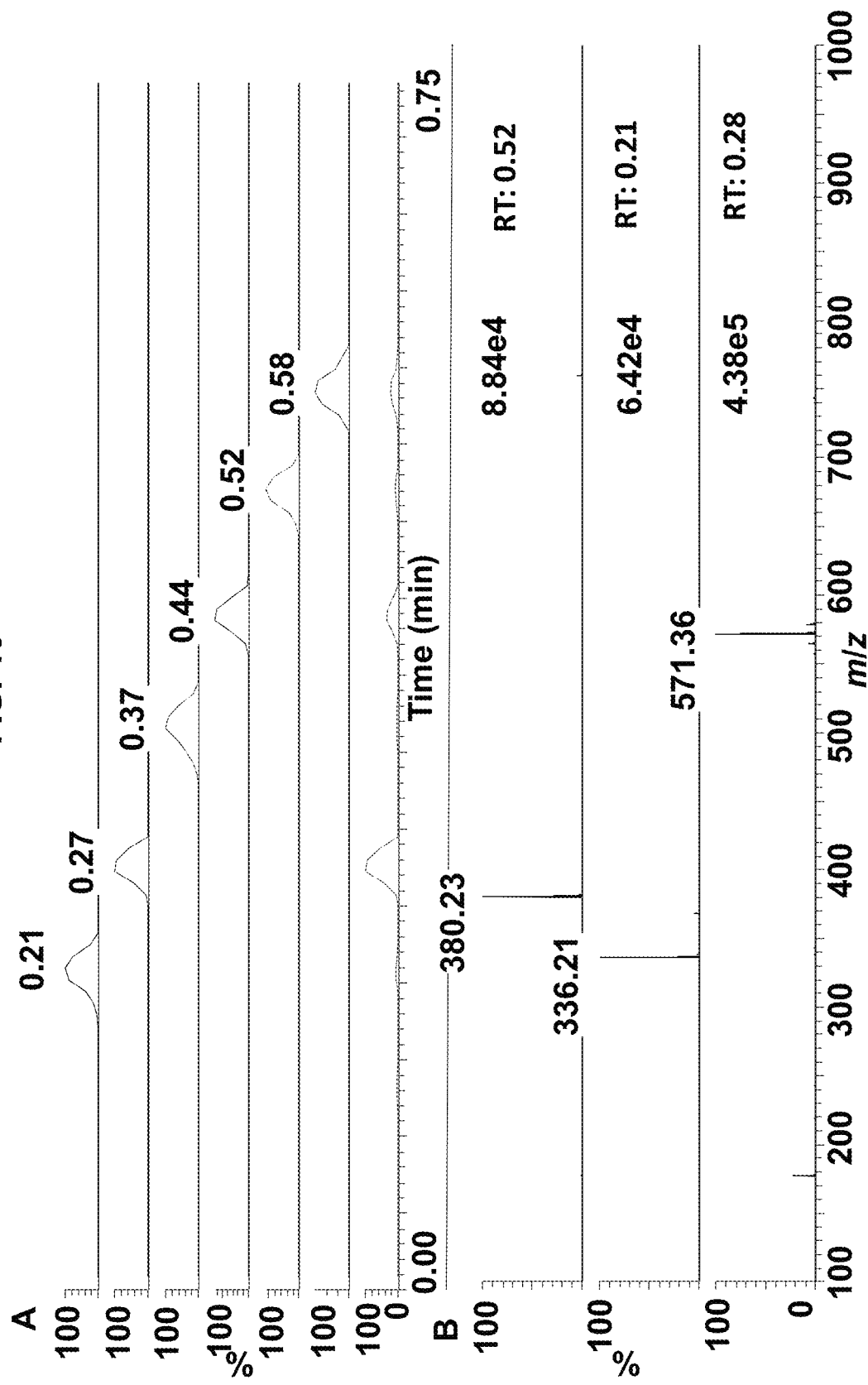
FIG. 10 shows in FIG. 10A the ion current chronograms of 6 compounds in 0.4 minutes obtained using the improved ion source with vMAI

FIG. 10 demonstrates acquiring mass spectra of six analytes associated with the 3-nitrobenzonitrile (3-NBN) by vMAI using the invention described herein. The samples were applied to a glass slide sample plate 110 from solution and allowed to air dry in a manner in which the samples aligned with the channels 109 in a spacer plate 108. In order to acquire mass spectra of sequential samples, the sample plate device 107 manually slides over the channel 102 in the flange device 101 to expose each sample sequentially to the vacuum of the mass spectrometer initiating ionization. Graph A (top) is the selected ion current chronograms for the protonated molecular positive ion for lysergic acid 2,4-dimethylazetidid (0.21 min), gramicidin S (0.27 min), erythromycin (0.37 min), 6-allyl-6-nor-LSD (0.44 min), 1-propionyl-lysergic acid diethylamide (0.52 min), and hydrochloroquine (0.58 min). In graph B (bottom), for clarity, mass spectra are only shown for retention times 0.52, 0.21, and 0.28 from top to bottom respectively. Protonated singly charged ions are observed for 1-propionyl-lysergic acid diethylamide and lysergic acid 2,4-dimethylazetidid, and the doubly charged ion of the peptide gramicidin S at m/z 571.36. No carryover is observed between samples when amounts of analyte ranging from 1.5 nanomoles to 1 picomole were loaded onto the glass slide in a matrix solution and dried before acquisition. All six samples were acquired in ca. 24 seconds or ca. 4 seconds per sample.

Figure 11:
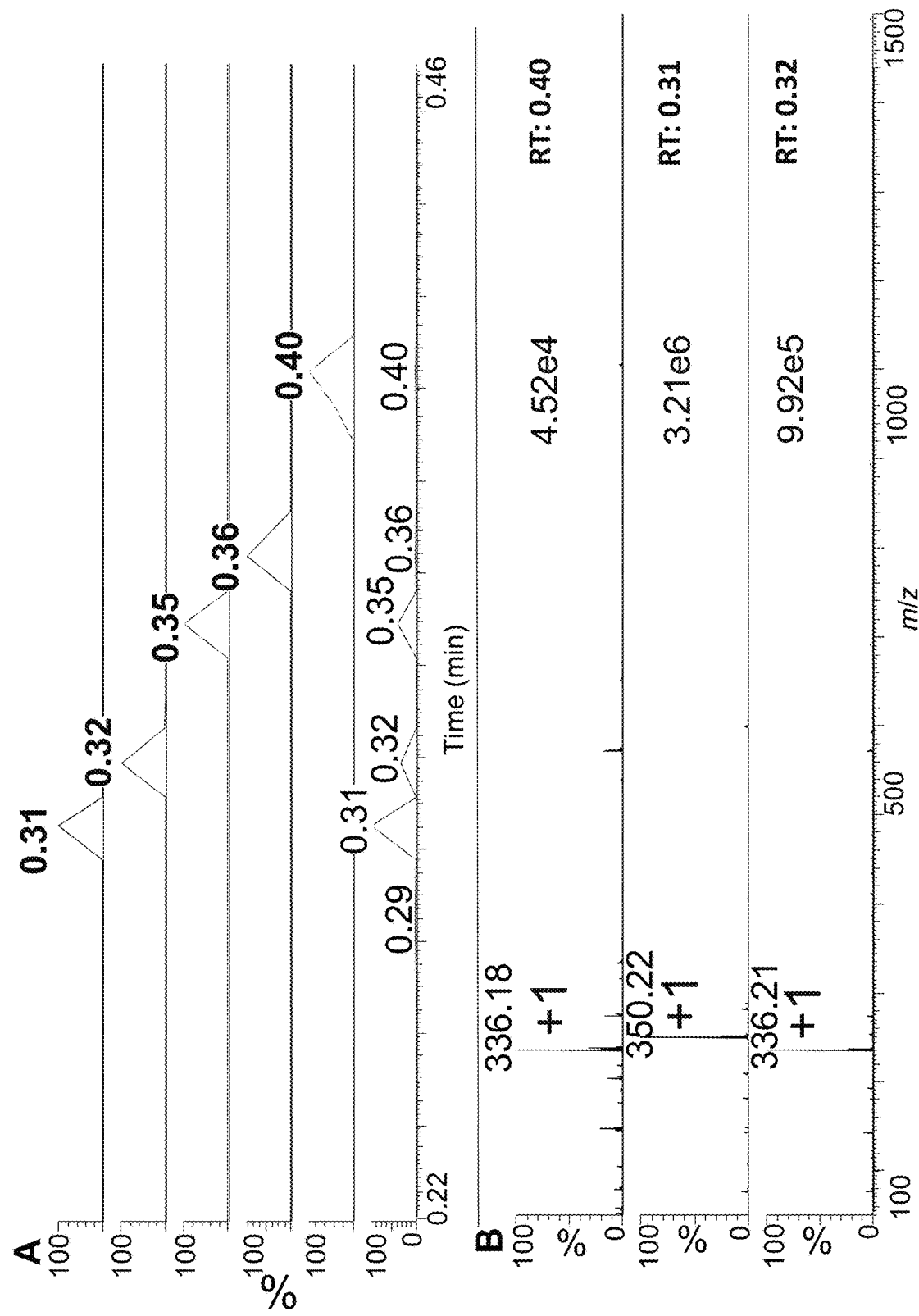
FIG. 11 is a high throughput vMALDI analysis example demonstrating ionization of a blank plus 5 samples in ca. 1 second for each sample using the ion source apparatus described herein on an Orbitrap mass spectrometer.

FIG. 11 is shows the acquisition of five samples plus a blank using the same apparatus setup as FIG. 10, but with ionization using the vMALDI method. The blank is only the CHCA matrix spotted on a glass microscopy sample plate 110. All samples were spotted from solution onto a glass microscopy slide in a linear row and allowed to dry similar to the dried droplet method used with MALDI. The spotted samples align with the channels 109 in the spacer plate 108. Transmission geometry laser ablation was employed to initiate ionization. Because the sample being ablated is exposed through channel 102 in flange device 101 to the vacuum of the mass spectrometer 130 when laser ablated, ionization is by vacuum MALDI (vMALDI). Because ionization occurs immediately upon laser ablation of the sample and ceases when the laser no longer strikes the sample, sequential analysis of samples can be faster than demonstrated with vMAI. Acquisition of the blank and 5 samples required only ca. 7 seconds or at a rate of ca. 1 second per sample as seen in the selected ion current chronogram of the protonated molecular ions in the top half of the figure. In the top graph the peak with a retention time of 0.31 minutes is of 1.5 nanomoles of 6-allyl-6-nor-LSD, the retention time 0.32 minutes is of 1.5 nanomoles of lysergic acid 2,4-dimethylazetidide, the peak at retention time 0.35 minutes is of 1.5 nanomoles of 1-propionyl-lysergic acid diethylamide, the peak at retention time 0.36 minutes is of 1 picomole of gramicidin S, and the peak with retention time 0.40 minutes is of 1 nanomole of hydroxychloroquine applied to the glass slide in a 10:1 acetonitrile:water saturated solution of the matrix CHCA. As expected for MALDI, all compounds produced singly protonated molecular ions as in shown in the bottom half of the figure for (top to bottom) hydroxychloroquine, 6-allyl-6-nor-LSD, and lysergic acid 2,4-dimethylazetidide. Despite of the short acquisition time, the ion abundances are 4.52e4, 3.21e6, and 9.92e5, respectively.

Figure 12:
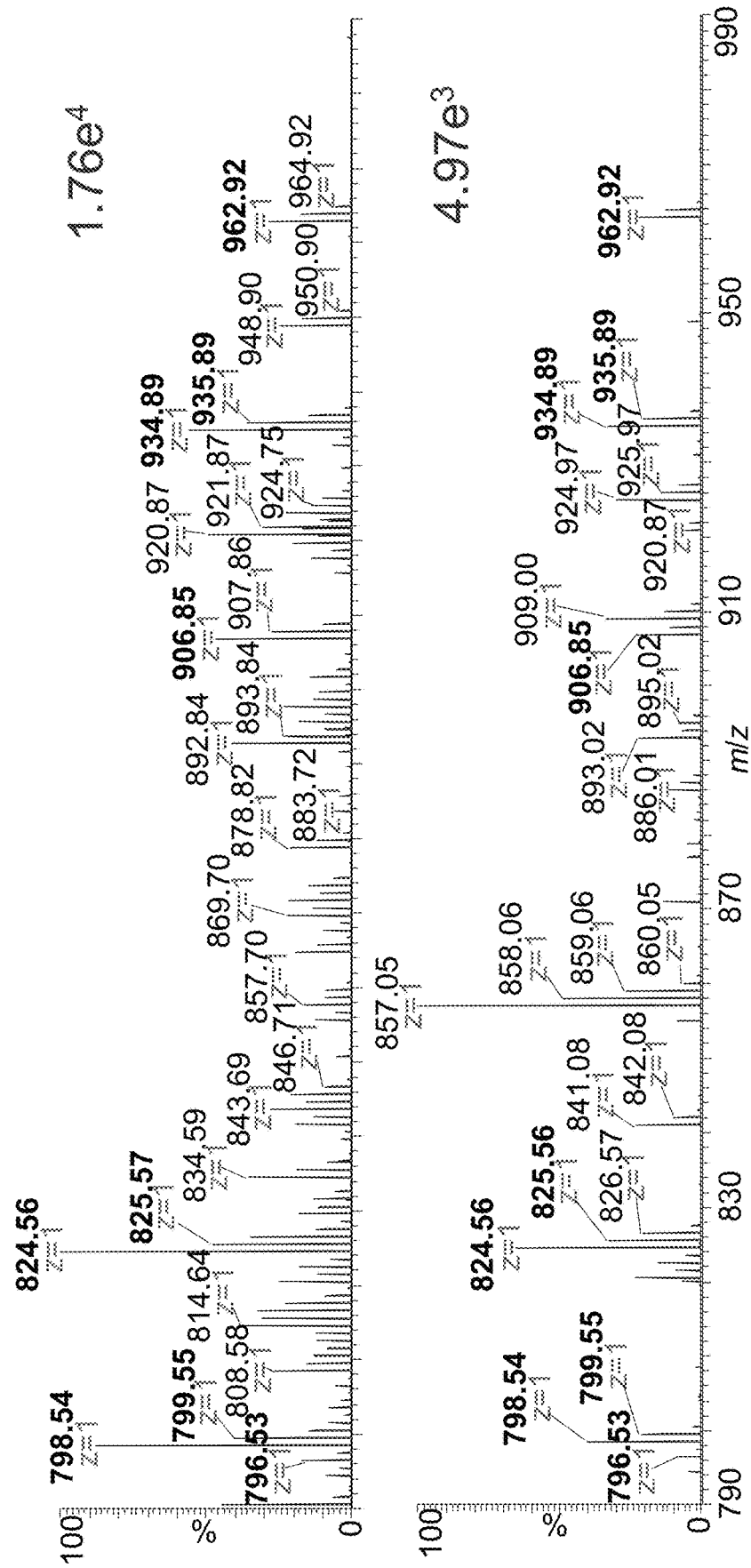
FIG. 12 is the limited mass range mass spectrum of a fungus smeared onto a sample plate using the ion source apparatus described herein interfaced to an Orbitrap mass spectrometer using vMAI and vMALDI on the same fungus with two different matrices.

FIG. 12 it the mass spectra of a fungus sample collected via a wooden toothpick off of a strawberry and smeared onto a glass microscopy slide and treated by adding a drop of 70% formic acid and letting it dry before adding a matrix solution. To one portion of the fungus smear was added a 3:1 acetonitrile:water solution of 3-nitrobenzonitrile and to another portion was added a 3:1 acetonitrile:water solution of 2,5-dihydroxyacetophenone. Using the device of the present invention, the top spectrum represents the ions spontaneously produced with the 3-nitrobenzonitrile matrix applied to the fungus smear and exposed to sub AP of the mass spectrometer, and the bottom spectrum represents the ions produced when the 2,6-dihydroxyacetophenone matrix applied to the fungus smear was laser ablated using a nitrogen laser. For clarity, only the region between m/z 790 and 990 are shown. All charge states (z) are +1. The peaks with bolded m/z values are those that appear in the vMAI and vMALDI mass spectra and the other peaks represent ions which are unique to each method. The top mass spectrum was generated by sliding the sample platedevice so that the sample using the 3-NBN matrix was first exposed to the lower pressure region of the mass spectrometer and then the laser was switched on and the area with the 2,5-dihydroxyacetophenone matrix was exposed to the lower pressure while laser ablated. Both mass spectra were acquired in less than 30 seconds.

Figure 13:
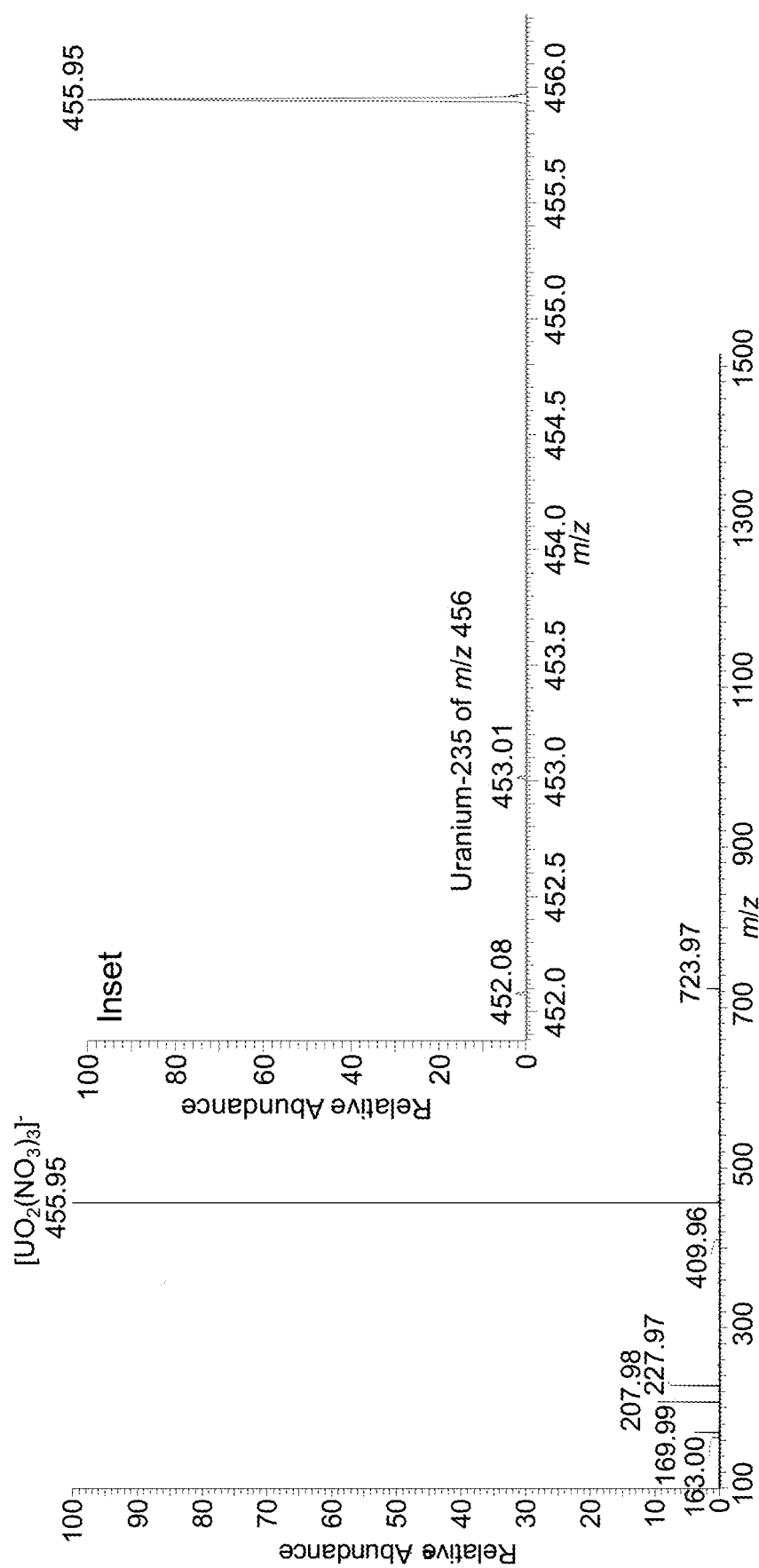
FIG. 13 is the mass spectrum of uranyl nitrate containing the most abundant uranium-238 isotope and detection of the lower abundant uranium-235 isotope (inset) using the ion source apparatus described herein on an Orbitrap mass spectrometer operated in the vMAI mode using a wet binary matrix mixture in the negative mode of detection.

FIG. 13 is the mass spectrum of uranyl nitrate containing the most abundant uranium-238 isotope as well as the much lower abundance uranium-235 isotope shown in the inset. This depleted sample dissolved in an aqueous solution containing 2% nitric acid was placed together with a matrix mixture of 3-NBN and CHCA on a microscopy glass slide and analyzed immediately before the sample could dry using the ion source apparatus described herein interfaced to an Orbitrap mass spectrometer using vMAI in the negative ion mode. The detection limit for uranyl nitrate was between 1 and 10 picograms. Detection of the uranium-235 isotope was consistent when loading 1 nanogram of uranyl nitrate. Neither contamination of the source nor carryover were observed demonstrating the robustness of this source and method. Note, in the vMALDI mode of the same sample, uranyl nitrate was not detected.

The procedure by which these samples are acquired are the following. The sample solution (in water, or water and organic solvent, or an organic solvent, with or without use of additives such as acids) is applied to the sample plate followed by addition of a matrix solution, typically in an organic:water solvent mixture, as in the dried droplet method used in MALDI, or alternatively, the sample solution and matrix solution are premixed and applied to the sample plate and typically allowed to dry. In some cases, it is beneficial to expose the sample while still wet to the vacuum of the mass spectrometer. Solvents that have been used most beneficially include acetonitrile, water, methanol, and formamide, but other solvents such as dimethylsulfoxide can be advantageously used. Additives such as ammonium salts reduce the background ions, especially in vMAI.

Other methods may be successfully used. In MALDI, a matrix such as CHCA, DHAP, dihydroxybenzoic acid or other MALDI matrix and mixtures thereof or with other matrices and additives are used, whereas in vMAI, matrices such as 3-NBN, coumarin, methyl-2-methyl-3-nitrobenzoate, or other vMAI matrices and mixtures thereof with or without additives are used. Interestingly, even compounds that do not work as pure matrixes such as 3-methylnitrobenzoate, previously not reported as an MAI matrix, as well as compounds that do work as vMAI matrices such as 1,3-dicyanobenzene, or 1,3-dinitrobenzene, can be used to enhance the sensitivity or the breadth of compounds in the sample to be ionized when mixed in combination with vMAI or vMALDI matrices, to perform in either case, vMAI.

In the invention described herein, in a preferred embodiment, the sample plate device 107 is placed in the feeder cartridge 112 at AP for automated operation, or for manual operation directly inserted between the guide rails 103a and 103b. The lowest sample plate device 107 in the feeder 114 drops onto rail 103b and can be moved into position over the channel 102 of flange device 101 which may be covered by a sliding valve plate 106 with hole 106a. The valve plate is then opened by moving the plate so that hole 106a is aligned with channel 102 in the flange device 101, and the sample plate device moved so the first sample is over channel 102. If using vMAI, ionization commences at this point without need of application of any external energy to the sample. For vMALDI and vLSI, a laser must be used to ablate the sample. Once sample acquisition is complete, the valve plate is closed and the sample plate device moved into the receiver cartridge 113 unless a second sample plate device is in position. Multiple sample plates can be acquired sequentially using vMALDI, vMAI, vLSI or combinations thereof, as well as other ionization methods using laser ablation of the sample. Typically, adjacent samples can be acquired at least as fast as one/second using vMALDI and one/4 seconds using vMAI. Adjacent samples on adjacent sample device plates require as little as two additional seconds. All components of sample plate devices 107 can be cleaned and reused. Tracking of samples and correlating with date can occur using barcodes. Sample plates can be stored or immediately disposed depending on the nature of the task. Robotics, streamlining, remote control including hardware/software operation is key for safety and smooth operation independent of laboratory status such as a pandemic response and improved health outcomes (cancer detection, differentiation, classification and of type and stage; bacterial infections, multiple bacteria, specie, genus, strain level; viral infections, mutations; fungi, etc.).

In vMAI, ions are produced from the entire surface of the sample until the sample is moved out of the position over the channel to vacuum, or the matrix is depleted, whichever occurs first. For vMALDI, ions are generated only in the area receiving sufficient laser energy to ablate a portion of the sample. Thus, vMALDI samples a small area during a laser pulse. Moving the point of ablation by either moving the sample or the laser beam allows improved sensitivity by summing mass spectra and provides an improved molecular representation of the sample. In the method in which samples are in a linear row, described above, with a fixed position laser beam, laser ablation occurs in a straight line as the sample moves across the laser beam. With sufficient laser fluence a defocused beam will sample a larger area. Alternatively, the laser beam can be moved (rastered) by, for example, tilting the focusing lens. This can be accomplished in transmission or reflective geometry, and be used for surface imaging and to increase the area sampled and thus provide an improved molecular representation and increased sensitivity.

While high speed analyses are desirable for high throughput analyses, there are applications where having longer time to sum ions in for example ion mobility or to achieve multiple ion fragmentation as in data dependent acquisitions known to those practiced in the art. This is readily achieved with vMAI by simply positioning the sample over the channel 102 until the desired information is achieved before moving to the adjacent sample. In vMAI, ionization continues until the matrix has completely sublimed which is usually ample time for numerous MS, MS/MS, IMS/MS, or IMS/MS/MS experiments. Similarly, in vMALDI and vLSI, the sample or beam can be moved around the same sample to achieve prolonged ionization. Simple and fast (seconds) switching between vMAI and vMALDI allows an improved degree of chemical information obtained on the same mass spectrometer and without having to vent the mass spectrometer. This allows maximum compatibility with other techniques known to practitioners, as, for example, use of gas-phase separation technologies such as ion mobility of singly or multiply charged ions.

Moving the laser beam across a sample or moving the sample across the beam provides a method to produce a molecular image of a surface by collecting mass spectra, each of which represents a pixel in the image and transforming the data into images of any ion (more specifically, each m/z) for which there is sufficient signal. Methods of molecular imaging are available for MALDI and vLSI and can be applied here. With either transmission or reflective geometry, rastering the laser beam is only useful for imaging small areas typically less than ca. 3 mm$^2$, and potentially single cells. One method of transmitting the laser beam for either transmission or reflective geometry is use of fiber optics which provides safety and another means of moving the position the laser beam illuminates.

However, moving the sample relative to the aperture to vacuum and the stationary laser beam allows a larger area to be imaged. As an example, a tissue slice with matrix applied can be placed on a glass slide which is then placed on a spacer plate with a channel large enough to encompasses the tissue slice. This arrangement introduces a larger gas load into the instrument, but slow movement of the channel over the channel to vacuum allows pumping the volume slowly without undue disturbance of the vacuum of the mass spectrometer. Imaging can be with the laser in transmission or reflective geometry, but transmission geometry allows easier and better focusing of the laser beam for improved spatial resolution: spatial resolution is also more effectively achieved using ultraviolet (UV) radiation relative to infrared (IR). The disadvantage of transmission geometry is the need for higher laser power to penetrate the sample holder and, e.g., the tissue and still provide sufficient energy to ablate the matrix and enable initiation of the analyte ionization process.

A major advantage of the multi-ionization source that is not available with MALDI-Tof is the high resolution, accurate mass measurement, and MS$^n$ (or MS$^E$ on some mass spectrometers) fragmentation which can be achieved using high performance API mass spectrometers with high resolution and mass accuracy capabilities such as the Thermo Q-Exactive Focus used in these studies. Further, for peptides and proteins, advanced fragmentation such as electron transfer dissociation (ETD) can be applied to obtain sequence information from fragment ions. MALDI does not produce the multiply charged ions necessary for successful ETD, but acquiring the same sample with vMAI only requires adding a vMAI matrix solution to the sample to obtain multiply charged ions for analysis by ETD fragmentation or collision induced fragmentation. Note, to the best of our knowledge, this is the first vMAI source operational with advanced fragmentation technology capabilities for improved sequence analyses and accurate identification (ID) of isoforms (including proteins) and chemical and post-translational modifications (PTM's). Note that a sample acquired by vMAI such that all the matrix has sublimed can be acquired by MALDI after adding only a MALDI matrix solution and dried.

The present invention also offers advantages relative to quantification. MALDI methods in general have 'hot spots" related to the crystal formation and ablation of rather small areas of the sample. With the multi-functional ion source, it is fast and simple to switch to vMAI mode where ionization occurs from a large surface area and if desired data can be collected until the sample fully sublimes to provide improved ion statistics and a better representation of the entire sample. These improvements are especially important for extracting relative quantitative information of the full mass range for reliable analyses of sample composition without prior knowledge or assumptions using, e.g., multiple reaction monitoring (MRM) transitions of the sample composition. Best quantification is achieved with internal standards, however.

In summary, the inventions of this application entail a means of rapidly interchanging multi-sample plates and rapidly sequentially exposing the samples individually to the vacuum of the mass spectrometer such that ions or charged particles produced from the sample, either by laser ablation (vMALDI or vLSI), or by using a more volatile matrix (vMAI), traverse from the sample surface into the mass analyzer of the mass spectrometer for detection. To our knowledge, this is the first multi-mode ionization apparatus based on the principle of vacuum ionization, and methods developed using the constructed source. There are numerous advantages of the inventions described herein. Sensitivity (low attomole detection), robustness (minimized carryover and instrument contamination), speed (full scan acquisitions faster than 1 sample/second), and simplicity (sample handling from AP) have been demonstrated with this multi-ionization source. Low and high mass applications are possible and with higher mass range analyzers can be further extended for the singly charged vMALDI ions. The sample plate remains at or near AP except for the sample being analyzed. Further, the method of exposing the sample to vacuum and maintaining the vacuum of the mass spectrometer involves use of stacked plates which are able to slide one over the other to achieve the desired alignment without loss of the substantial vacuum seal. Because it is only necessary to expose a single sample to vacuum at a time, there is no need for additional pumping or a time consuming pump down chamber to load an entire plate of samples. However, it should be recognized that multiple samples may be exposed to vacuum simultaneously and then moving each sample over the channel in the flange, and for vMALDI into the laser beam. Acquiring mass spectra from sequential single samples at ca. 1 per second, and in certain configurations <1 second per sample, has been demonstrated using laser ablation and 1 sample every 3 seconds for vMAI. It is anticipated that further improvements can be made. Significantly, these are full mass spectral acquisitions. A 2-dimensional arrangement of samples on a sample plate can be used, but is unnecessary for high throughput analyses because the method herein described allows sequential loading of sample plates in about 2 seconds. In other words, there is a gap of only ca. 2 seconds between the last sample of a prior plate and the first sample of the following plate. Multiple plates with linear arrays of samples can be loaded. Further, the apparatus of the invention described herein can replace the ion source and inlet assembly of a commercial mass spectrometer in less than 1 hour plus the time to vent and pump down the mass spectrometer, and the process can be reversed for ionization by ESI or APCI, as examples. Another advantage is that this multi-functional source can be readily converted to include traditional API (e.g., ESI, AP-MALDI, as examples) and ambient ionization (e.g., DESI, paper spray, as examples) methods as well as inlet ionization. This switch does not require venting the instrument and provides a convenient means of calibrating the mass spectrometer using ESI. A further advantage of this invention is that vacuum chamber 120 with rotary pump 124 and restriction 130, necessary on API instruments, are not a requirement for the apparatus described herein. Thus, a mass spectrometer designed around this invention can be simplified with lower cost and space requirements by eliminating the inlet chamber with associated rotary pump because of the much lower gas load to the instrument using the methods described herein. Thus, this invention is not only applicable to mass spectrometers designed for API, but also to Tof mass spectrometers potentially providing more rapid analyses and use of transmission geometry laser ablation.

While specific examples are provided, it should be understood that other arrangements are possible including sample plate assemblies with larger sample indentations, or spacer plates with larger channels to allow not only surfaces for imaging, but also multiple samples when using MALDI. Circular sample plate assemblies and even 96-sample well plates of the proper design can be used. This invention also relates to use with either MALDI or vMAI and does not require that both be instituted. The apparatus of the present invention can be a standalone vMAI or standalone MALDI or LSI source. Thus, the inventions described herein should be interpreted broadly.

What is claimed:

1. A method for introducing at least one sample containing at least one analyte to an analyzer device to produce a plurality of gas phase ions of the at least one analyte, the method comprising:

providing a first plate device configured to facilitate delivery of the at least one sample to a sub-atmospheric pressure of the analyzer device, the first plate device comprising:
  a sample plate, wherein the at least the sample is disposed on the sample plate; and
  a spacer plate having plurality of channels and a first edge;
connecting a flange device to the analyzer device, wherein a conduit passes through the flange device, the conduit having a first end open to the higher pressure external to the analyzer device and a second end open to the sub-atmospheric pressure of the analyzer device, and wherein the first end and the second end of the conduit are in fluid communication with each other, and wherein the higher pressure external to the analyzer device is substantially atmospheric pressure;
placing a first surface of the first plate device in contact with a first surface of the flange device;

aligning the sample on the sample on plate with a channel of the plurality of channels of spacer plate;

covering the first end of the conduit with the first plate device to form a substantial seal between the higher pressure external to the analyzer device and the sub-atmospheric pressure within the analyzer device, wherein the at least one sample is in position for the at least one analyte contained in the at least one sample to be converted to at least one of gas-phase ions or charged particles; and simultaneously removing the first plate device from the first end of the conduit and moving a second plate device to cover the first end of the conduit to maintain the sub-atmospheric pressure within the analyzer device by contacting the first edge of the spacer plate with a first edge of the second plate device.

2. The method of claim 1, wherein the first plate device is disposed within atmospheric pressure except for an area containing the at least one sample when the at least one sample is aligned with the first end of the conduit.

3. The method of claim 1, wherein the at least one sample contains the at least one analyte and a matrix, wherein the matrix is configured to produce gas phase ions.

4. The method of claim 3, wherein the matrix is one of a solid, a liquid, or a combination of the solid and the liquid.

5. The method of claim 1, wherein the first plate device is disposed between at least two guide rails on the flange device.

6. The method of claim 1, further comprising:
placing, on the sample plate of the first plate device, the at least one sample containing the at least one analyte in a solution or on a solid, wherein the at least one sample is configured for a matrix-assisted laser desorption/ionization (MALDI) process or the at least one sample is configured for a laser desorption/ionization (LDI) process; and
exposing the at least one sample to a laser radiation that produces substantially singly charged gas phase ions of the at least one analyte by one of the MALDI process or the LDI process.

7. The method of claim 1, further comprising:
placing the at least one sample containing the at least one analyte in a solution containing a vacuum matrix-assisted ionization (vMAI) matrix;
placing the at least one sample and vMAI matrix solution on the sample plate; and
exposing the at least one sample to the sub-atmospheric pressure by aligning the at least one sample with the first end of the conduit thereby spontaneously producing gas phase ions of the at least one sample and at least one charged cluster by a vMAI process.

8. The method of claim 7, wherein the at least one sample delivered by the sample plate is spaced apart from the flange device by the spacer plate when the first plate device containing the sample plate and spacer plate is in contact with the first surface of the flange device.

9. A method of claim 1, further comprising applying a voltage to at least one of the first plate device, an extraction lens disposed within the analyzer device, or an ion transmission optics disposed within the analyzer device.

10. A method of claim 1, wherein the analyzer device further comprises a laser either aligned in transmission geometry or reflection geometry relative to the position of the at least one sample, the method further comprising operating the laser to provide at least one of ultraviolet, visible, or infrared wavelength.

11. A method of claim 1, wherein the at least one analyte comprises at least one of inorganic salts and complexes, biological compounds, clinical compounds, biomedical compounds, forensic compounds, environmental compounds, agriculture compounds, drugs of abuse, pharmaceuticals, oil compounds, petroleum compounds, synthetic polymers, dendrimers, microbes, bacterial pathogens, viral pathogens, cancer compounds, or biomarkers of diseases.

12. A method of claim 11, wherein the at least one analyte is collected from at least one of a glass plate, a metal plate, thin layer chromatography (TLC) plates, gels, Western blots, filter paper, swabs, leaf, hair, fruits, vegetables, meats, plastic, polymers, film, living biological tissue, or sectioned biological tissue.

13. A sample introduction system used with an analyzer device comprising:
a first plate device having at least one first surface, the first plate device comprising:
a sample plate; and
a spacer plate having a plurality of channels and at least one first edge;
a second plate device having at least one first edge; and
a flange device disposed between a sub-atmospheric pressure within the analyzer device and a higher pressure external to the analyzer device, the flange device comprising:
a conduit extending through the flange device and having a first end and a second end, the first end defining an opening configured to be disposed in the higher pressure external to the analyzer device, the second end defining an opening configured to be disposed in the sub-atmospheric pressure within the analyzer device, the first end and the second end being in fluid communication with each other;
at least one first surface of the flange device configured to be placed in contact with the at least one first surface of the first plate device, the first plate device configured to deliver the at least one sample to the sub-atmospheric pressure within the analyzer device when the at least one sample is aligned with a channel of the plurality of channels of the spacer plate and the first end of the conduit,
wherein, when the at least one first surface of the first plate device is in contact with the at least one first surface of the flange device and covers the first end of the conduit, the first plate device provides a substantial seal to prevent gas flow through the conduit, maintaining the sub-atmospheric pressure within the analyzer device, and
wherein the at least one first edge of the spacer plate is configured to contact one of the at least one first edge of the second plate device such that, when the first plate device is removed from the flange device, the second plate device may be moved simultaneously in front of the first end of the conduit to maintain the sub-atmospheric pressure within the analyzer device.

14. The sample introduction system of claim 13, wherein an inner diameter of the conduit is in a range of 2-10 millimeters.

15. The sample introduction system of claim 13, wherein the conduit is substantially on-axis with a first ion transfer optics.

16. The sample introduction system of claim 13, wherein the at least one sample plate is made of at least one of paper, glass, quartz, metal, or polymer and has a plurality of first surfaces and a plurality of first edges.

17. The sample introduction system of claim 13, wherein the plurality of channels of the spacer plate have diameters that are substantially the same as that of the conduit.

18. The sample introduction system of claim 13, wherein one or more indentations in the at least one sample plate or the plurality of channels of the spacer plate hold the at least one sample such that the at least one sample does not contact the at least one first surface of the flange device.

19. The sample introduction system of claim 13, wherein the first plate device comprises one or more sample delivery positions in a linear configuration so that a movement in one direction using one of manual or automated movement aligns individual sample positions sequentially with the first end of the conduit in the flange device.

20. The sample introduction system of claim 13, wherein the first plate device has an inlet tube made of metal, the inlet tube configured to make a seal with the at least one sample plate, and wherein the inlet tube has a channel therethrough having an inner diameter between 0.4 and 1.0 mm.

21. The sample introduction system of claim 20, wherein the inlet tube is configured to transmit one of gas phase ions or charged particles produced from the at least one sample by one of a process consisting of electrospray ionization (ESI), solvent-assisted ionization (SAI), electrospray ionization inlet (ESII), matrix-assisted ionization (MAI), laser spray ionization (LSI), atmospheric pressure chemical ionization (APCI), atmospheric solids analysis probe (ASAP), direct analysis in real time (DART), paper spray ionization, and desorption ESI (DESI).

22. The sample introduction system of claim 13, wherein the flange device is constructed from a polymer or a metal.

23. The sample introduction system of claim 13, wherein the first plate device is configured to be replaced by the second plate device manually by a user or moved by computer directed robotics.

24. The sample introduction system of claim 13, further comprising at least one of an ion extraction lens, an S-lens, an Einzel lens, a tube lens, an ion funnel, a second conduit, quadrupole, a hexapole, or an octapole ion transmission device within the analyzer device.

25. A sample introduction system of claim 13, wherein the at least one sample comprises at least one analyte and a matrix.

* * * * *